(12) United States Patent
Biel et al.

(10) Patent No.: US 11,745,452 B2
(45) Date of Patent: *Sep. 5, 2023

(54) MODULAR PRODUCTION LINE FOR THE PRODUCTION OF OPHTHALMIC LENSES

(71) Applicant: Alcon Inc., Fribourg (CH)

(72) Inventors: Roger Biel, Aschaffenburg (DE); Karin Stoller, Frankfurt (DE); Daniel Kessler, Lützelhausen (DE); Burkhard Dietrich, Monheim (DE); Jens Hof, Grosswallstadt (DE)

(73) Assignee: Alcon Inc., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,147

(22) Filed: Dec. 1, 2021

(65) Prior Publication Data

US 2022/0082861 A1 Mar. 17, 2022

Related U.S. Application Data

(63) Continuation of application No. 16/109,044, filed on Aug. 22, 2018, now Pat. No. 11,215,844.

(Continued)

(51) Int. Cl.
*B29D 11/00* (2006.01)
*G02C 7/02* (2006.01)
*G02C 7/04* (2006.01)

(52) U.S. Cl.
CPC .. *B29D 11/00009* (2013.01); *B29D 11/00125* (2013.01); *B29D 11/00259* (2013.01);
(Continued)

(58) Field of Classification Search
CPC ........ B29D 11/00259; B29D 11/00125; B29D 11/00009; B29D 11/00509; G02C 7/024; G02C 7/04
See application file for complete search history.

(56) References Cited

U.S. PATENT DOCUMENTS 10,751,962 B2 *  8/2020  Zong ................ B29D 11/00182
10,983,251 B2 *  4/2021  Zong ................ B29D 11/00509
(Continued)

*Primary Examiner* — Mathieu D Vargot
(74) *Attorney, Agent, or Firm* — Sheng-Hsin Hu

(57) ABSTRACT

A production line (PL) for the production of ophthalmic lenses (7) comprises
a manufacturing module (MM),
an inspection module (IM), and
a packaging module (PP) in which the lenses identified by the inspection module (IM) as being acceptable are packed into primary packages.
The manufacturing module (MM) comprises a plurality of manufacturing stations (300, 301, 302, 310, 320, 321, 322, 330, 331, 340, 341, 342, 350, 351, 352). At least one of these manufacturing stations (310; 320, 321, 322, 330, 331) is configured to apply a lens identification code (70, 71, 72) to the respective lens. The lens identification code (70, 71, 72) includes information indicative of the type of the respective lens.
Either the inspection module (IM) or the packaging module (PP) includes a lens detection station (502, 604) configured to read the lens identification code (70, 71, 72) applied to the respective lens and to detect the type of the lens from the lens identification code (70, 71, 72) read from the respective lens in order to determine whether the type of lens detected actually is the type of lens which is expected to be detected by the lens detection station (502, 604) at that time.

12 Claims, 11 Drawing Sheets

Related U.S. Application Data

(60) Provisional application No. 62/549,552, filed on Aug. 24, 2017.

(52) U.S. Cl.
CPC ............... *G02C 7/024* (2013.01); *G02C 7/04* (2013.01); *B29D 11/00509* (2013.01)

(56) References Cited

U.S. PATENT DOCUMENTS

| 11,215,844 B2* | 1/2022 | Biel | B29D 11/00259 |
| 2011/0089585 A1* | 4/2011 | Biel | B29D 11/00317 |
| | | | 425/256 |

* cited by examiner

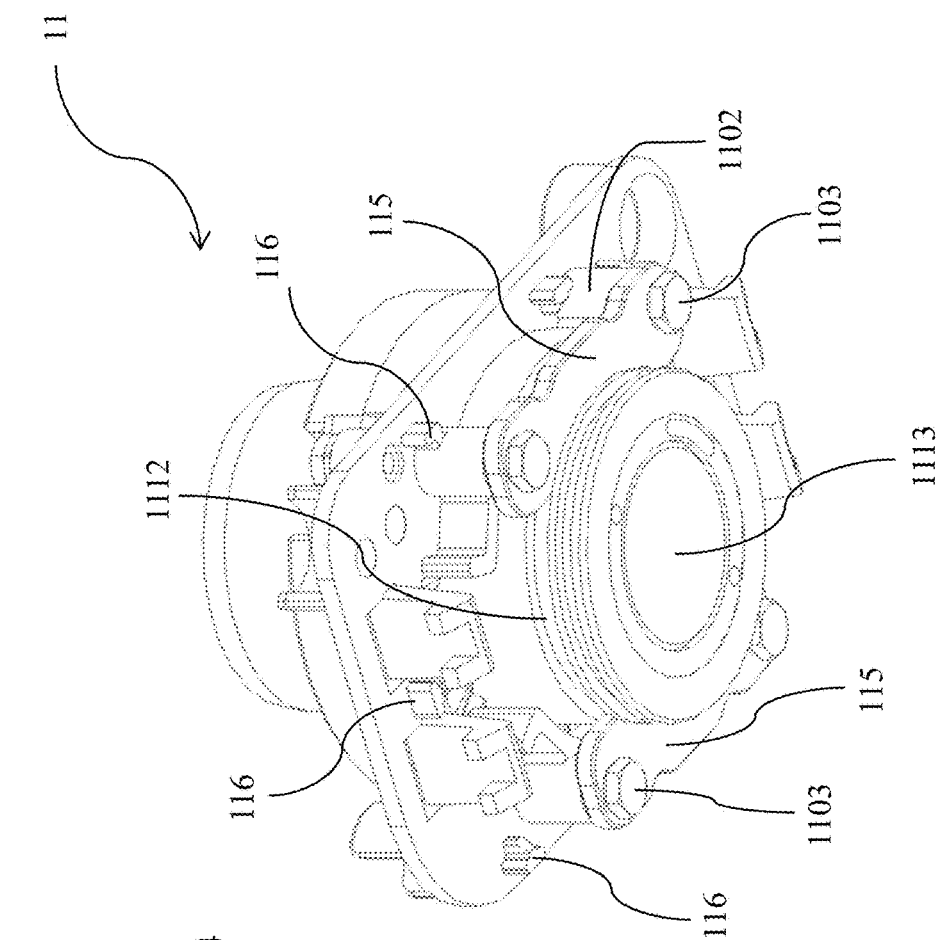
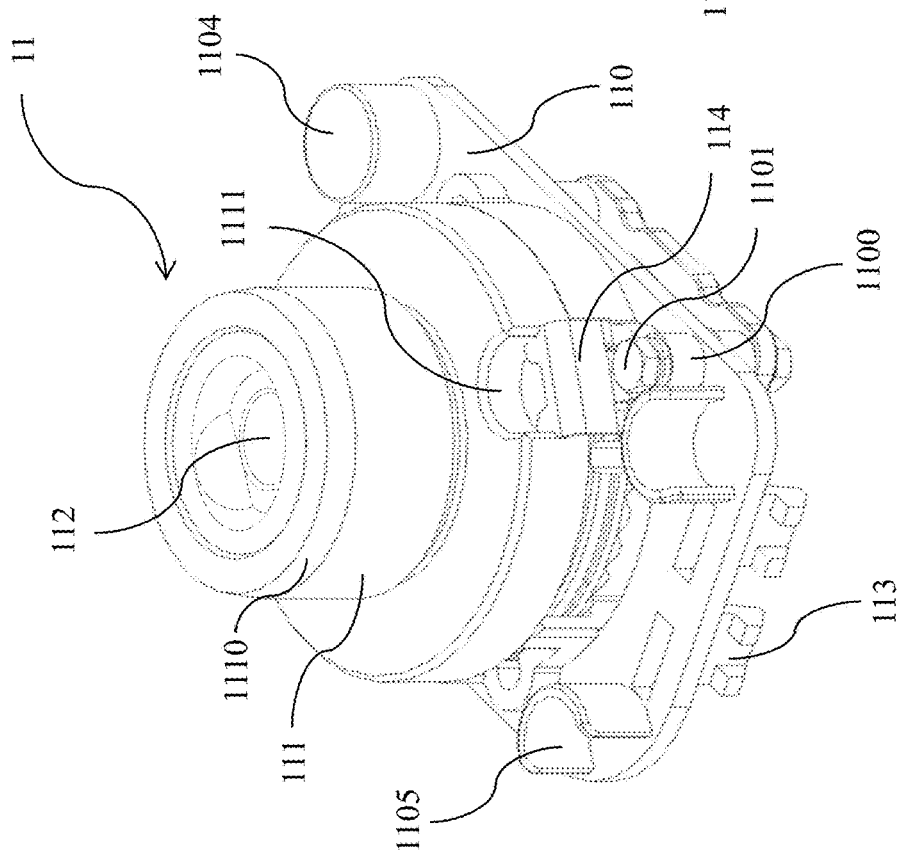
Fig. 6
Fig. 5

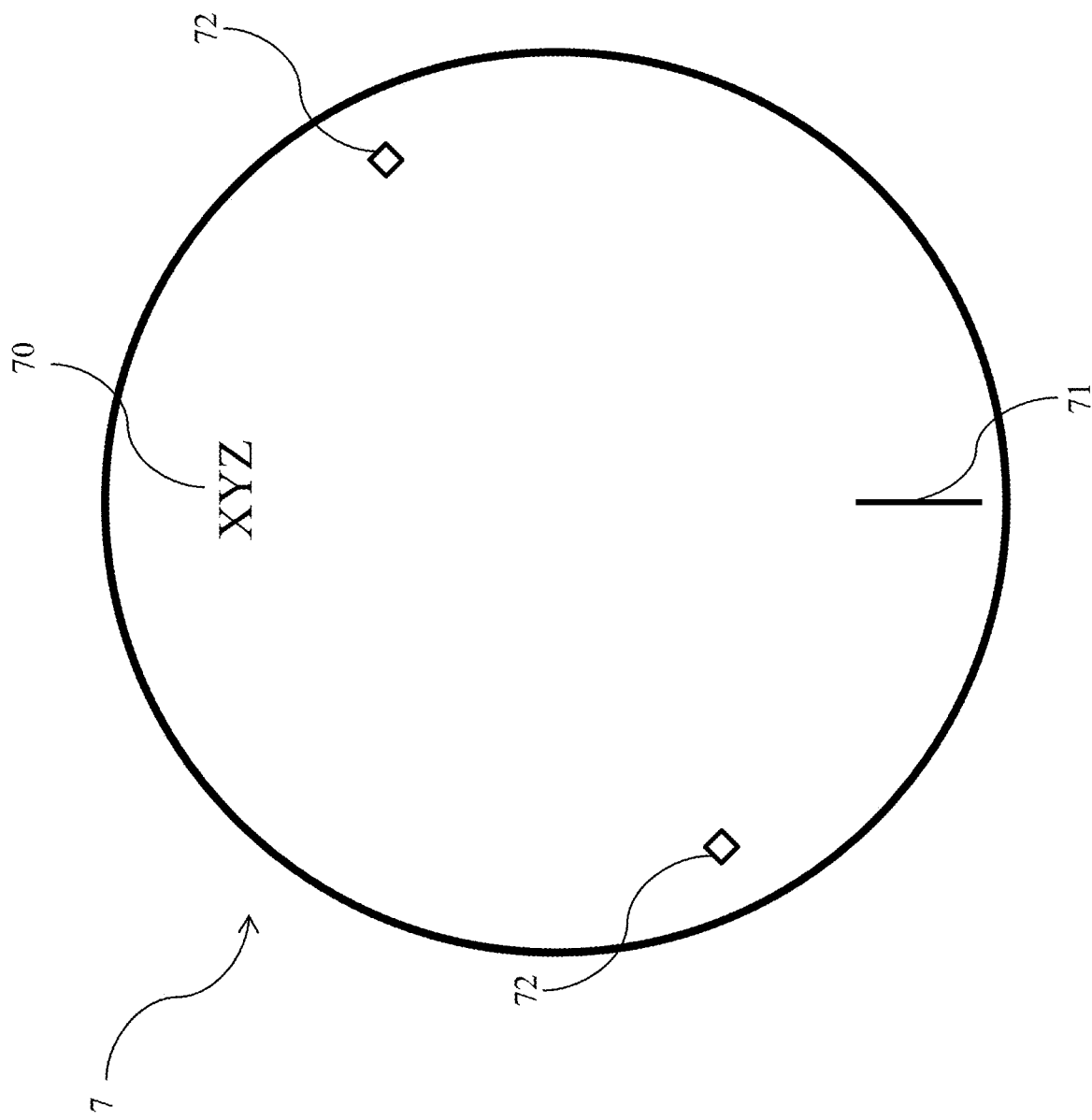

MODULAR PRODUCTION LINE FOR THE PRODUCTION OF OPHTHALMIC LENSES

This application is a continuation of application Ser. No. 16/109,044 filed on Aug. 22, 2018, now U.S. Pat. No. 11,215,844 which claims the benefits under 35 USC § 119 (e) of U.S. provisional application No. 62/549,552 filed 24 Aug. 2017, incorporated by reference in their entireties.

The invention relates to a modular production line for the manufacture of ophthalmic lenses, in particular contact lenses such as soft contact lenses.

The manufacture of ophthalmic lenses, in particular contact lenses such as soft contact lenses, is typically carried out in fully automated manufacturing lines where the contact lenses are produced in high numbers. In particular, contact lenses which are worn only once and which are disposed of after being worn need to be produced in very high numbers. Such contact lenses are produced, for example, in a closed-loop process with the aid of reusable lens molds made of glass which are used many times to produce the high number of contact lenses.

As regards the manufacture of the contact lenses, each mold typically comprises male and female mold halves which, upon being mated and closed, together form a mold cavity between them defining the geometry of the contact lens to be formed. Initially, a lens forming material is dispensed into one of the mold halves, for example into the female mold half, prior to the mold halves being mated. For the sake of simplicity, in the following it will only be referred to male molds and female molds rather than to male mold halves and female mold halves. After dispensing of the lens forming material into the female mold, the male and female molds are mated and closed, and the lens forming material enclosed in the mold cavity is polymerized and/or crosslinked to form the contact lens. Thereafter, the mold is opened again by separating the male and female molds, the contact lens is removed from either the male mold or the female mold, and the contact lens is then advanced for being further processed.

For example, in case the contact lens is a silicone hydrogel contact lens, solvents contained in the lens forming material which are also contained in the contact lens formed therefrom as well as any non-polymerized and/or non-crosslinked lens forming material need to be extracted from the contact lens. Also, a coating can be applied to the contact lens in order to improve lubricity of the contact lens to increase the comfort when the contact lens is worn on the eye. For these purposes, the contact lenses may be transported through different baths (extraction baths, water baths, coating baths) before the extracted and coated contact lens is further advanced for getting inspected.

Inspection of the contact lens is then performed and may comprise an inspection for defects of the contact lens such as bubbles, inclusions, edge defects, other cosmetic defects, etc., but may in addition also comprise measurement of the optical characteristics and the central thickness of the contact lens.

Once the contact lens has successfully passed inspection it is advanced to the primary packaging station where it is placed into a packaging shell. Packaging liquid is then dispensed into the packaging shell, and a foil is placed onto the shell and is heat-sealed thereto.

As regards the molds used in the manufacture of the contact lens, once the contact lens has been removed the male and female molds are cleaned, rinsed and dried and are then re-used to manufacture the next contact lens in the manner described above.

In the manufacture of contact lenses, typically a number of lots of contact lenses are produced on the production line at the same time with the aid of a plurality of lens mold carriers which are transported through the manufacturing stations of the production line. Each lens mold carrier comprises a frame having a predetermined number of mounting sites arranged at predetermined locations along the frame (for example fourteen mounting sites), and these predetermined number and locations of the mounting sites are identical for each lens mold carrier. Each lens mold carrier further comprises a predetermined number of mold units (for example fourteen mold units), which are removably mounted to the lens mold carrier, and each mold unit comprises either a reusable male mold or a reusable female mold. However, all molds of one lens mold carrier are of the same type, i.e. either all of them are male molds or all of them are female molds. Two lens mold carriers (one male lens mold carrier and one female lens mold carrier) of the plurality of lens mold carriers are assigned to each other to form pairs of lens mold carriers. Accordingly, at the mounting sites of one of the lens mold carriers of a pair of lens mold carriers male molds are arranged while at the mounting sites of the other lens mold carrier of a pair of lens mold carriers female molds are arranged, so that upon mating the lens mold carriers of the pairs the respective male and female molds are mated in order to form mold cavities defining the shape of the contact lenses to be manufactured.

By way of example, one lens mold carrier may be equipped with seven pairs of molds (fourteen molds in total), with the two molds of one pair being identical and being mounted to the frame at adjacently arranged mounting sites (i.e. the first pair of molds is arranged at mounting sites number one and two, the second pair of molds is arranged at mounting sites number three and four, and so on), so that with one carrier it is possible to manufacture seven pairs of contact lenses with different geometries, i.e. seven different lots at the same time (each of the seven pairs of molds forming a different lot). Each individual lens mold carrier of the plurality of lens mold carriers on the production line is equipped with the same molds in the same sequence, that is to say each individual lens mold carrier of the plurality of lens mold carriers on the production line is equipped with the same molds at the same mounting sites of the respective carrier. As a result, for example, contact lenses manufactured with the molds of the first pair (i.e. the mold halves at mounting site number one and mounting site number two of each of the lens mold carriers) always have the same geometries. This also holds for the other pairs (lots).

Before starting manufacturing, configuration of each of the individual lens mold carriers is performed off-line (each of the lens molds carriers is equipped at the individual mounting sites with the same molds in the same sequence). The lens mold carriers are then placed on the production line. Thereafter, manufacturing of the seven lots of contact lenses is performed for many hours. Accordingly, once the lens mold carriers are placed on the production line it is only possible to manufacture the same seven lots of contact lenses during these many hours. In case each individual mounting site on the lens mold carrier represents an individual lot, then it is possible to manufacture fourteen different lots at the same time, this being the maximum number of lots that can be manufactured during these many hours. This is an efficient manner to produce high numbers of contact lenses having a base curve radius selected from a certain range of base curve radii and having an optical power that is selected from a certain range of optical powers.

After the above-described manufacture of contact lenses has been performed for many hours, operation of the production line is interrupted and a line clearance is performed, i.e. the lens mold carriers are removed from the production line. New lens mold carriers which may have been configured off-line and which may be equipped with mold halves different from those that have been used before are then placed on the production line. Operation of the production line is then resumed.

Due to the fact that all individual lens mold carriers present on the production line are identically configured, always the same type of contact lenses is produced by the molds arranged at the same mounting sites on the lens mold carriers. Therefore, once the lens mold carriers are placed on the production line it is undoubtedly clear what type of contact lens is produced by the molds arranged at the respective mounting sites, since all lens mold carriers present on the production line are identically configured. Therefore, once the configuration of the lens mold carriers is determined and has been stored in the control unit of the production line, no check must be performed anymore as to what type of contact lens is actually produced by the molds arranged at the respective mounting sites on the lens mold carriers, and consequently no such check is actually performed. During inspection of the contact lenses produced on the production line it is therefore typically only determined whether the contact lenses have any defects such as flaws, tears, bubbles, inclusions, etc., and if a contact lens has successfully passed inspection it is placed into a packaging shell waiting at the packaging unit since it is clear what type of contact lens the inspected contact lens must be, since the type of contact lens is defined by the respective mounting site on the lens mold carrier.

However, if for any reason a contact lens of a different type shows up in the production line at a location where it normally must not show up (for example due to an error occurring in the production line), and such contact lens successfully passes the inspection it will be placed in the packaging shell, and information may be printed on the foil which may not correspond to the type of contact lens actually contained in the packaging shell. Also, when new lots (contact lenses with other geometries) are to be produced, all lens mold carriers have to be removed from the production line (line clearance). Thereafter, new lens mold carriers which have been configured off-line with molds suitable to produce the new lots (i.e. the contact lenses with the other geometries) are placed on the production line. Thereafter, a number of sample contact lenses must be produced, and only after these sample contact lenses have been produced and inspected and have been found to have the required specifications, production can be resumed. This is a laborious and time-consuming process with very considerably downtime of the production line during which no contact lenses can be produced.

It is therefore an object of the present invention to avoid the disadvantages of the prior art and to make sure that a foil sealed to a packaging shell is always printed with information that corresponds to the contact lens actually contained in the packaging shell and to avoid or greatly reduce the downtime in case new lots (i.e. contact lenses with different geometries) are to be produced.

In accordance with the invention, these and other objects are achieved by a production line for the production of ophthalmic lenses, in particular contact lenses such as soft contact lenses. The production line comprises a manufacturing module in which the ophthalmic lenses are manufactured, an inspection module in which the ophthalmic lenses manufactured are inspected, and a packaging module in which the ophthalmic lenses which have been identified by the inspection module as being acceptable are packed into primary packages.

The manufacturing module comprises a plurality of manufacturing stations for manufacturing the ophthalmic lenses. At least one of these manufacturing stations is configured to apply a lens identification code to the respective ophthalmic lens. The lens identification code includes information indicative of the type of the respective ophthalmic lens manufactured. Either the inspection module or the packaging module includes a lens detection station configured to read the lens identification code applied to the respective ophthalmic lens and to detect the type of the ophthalmic lens from the lens identification code read from the respective ophthalmic lens in order to determine whether the type of ophthalmic lens detected actually is the type of ophthalmic lens which is expected to be detected by the lens detection station at that time.

According to one aspect of the production line according to the invention, the lens detection station is arranged in the inspection module.

According to a further aspect of the production line according to the invention, the inspection module comprises a cosmetic inspection station for inspecting the ophthalmic lens for cosmetic defects, and the cosmetic inspection station is configured to include the lens detection station.

According to a further aspect of the production line according to the invention, the lens detection station is arranged in the packaging module.

In accordance with still a further aspect of the production line according to the invention, the lens detection station is arranged in the packaging module at a location downstream of a lens placement station for placing the ophthalmic lens into a primary package and upstream of a liquid dosing station for dosing a packaging liquid into the primary package, or is arranged downstream of the liquid dosing station.

In accordance with yet a further aspect of the production line according to the invention, the packaging module comprises a shell providing station for providing a packaging shell, the lens placement station for placing the ophthalmic lens into the packaging shell, the lens detection station, the liquid dosing station, a foil placement station for placing a foil onto the packaging shell, a sealing station for sealing the foil to the packaging shell, and a printing station for printing on the foil information about the ophthalmic lens contained in the sealed packaging shell.

In accordance with a further aspect of the production line according to the invention, the packaging module further comprises a configuration station for intermediately storing a plurality of ophthalmic lenses, and for placing an ophthalmic lens intermediately stored in the configuration station into a said packaging shell lens shell in case it has been detected in the lens detection station that no ophthalmic lens has been placed into the packaging shell in the lens placement station.

According to a further aspect of the production line according to the invention, the manufacturing module is configured to apply to each ophthalmic lens a unique lens identification code which is representative of the type of lens for a predetermined period of time.

According to still a further aspect of the production line according to the invention, the manufacturing module comprises molds for the manufacture of the ophthalmic lenses and a printing station, wherein the printing station is configured to print the unique lens identification code to at least one of the molds used to manufacture the respective ophthalmic lens.

According to yet a further aspect of the production line according to the invention, the printing station is an inkjet printing station.

In accordance with a further aspect of the production line according to the invention, the manufacturing module comprises molds for the manufacture of the ophthalmic lenses, the molds carrying the unique lens identification code as (permanent) elevations formed on a molding surface of at least one of the molds used to manufacture the respective ophthalmic lens.

According to another aspect of the production line according to the invention, the manufacturing stations of the manufacturing module are arranged in a closed loop, and the manufacturing module further comprises a plurality of lens mold carriers which are transported through the manufacturing stations arranged in the closed loop.

Each lens mold carrier comprises a frame having a predetermined number of mounting sites arranged at predetermined locations along the frame. The predetermined number and locations of the mounting sites are identical for each lens mold carrier of the plurality of lens mold carriers.

Each lens mold carrier further comprises a predetermined number of molds corresponding to the predetermined number of mounting sites of the frame. The molds are removably mounted to the frame at the mounting sites. All molds of a said lens mold carrier either are reusable male molds, or all molds of the said lens mold carrier are reusable female molds.

Two lens mold carriers, respectively, of the plurality of lens mold carriers are assigned to each other to form a pair of lens mold carriers in a manner such that for each pair of lens mold carriers, at the mounting sites of one lens mold carrier reusable male molds are arranged, while at the mounting sites of the other lens mold carrier of the said pair reusable female molds are arranged. Upon mating the two lens mold carriers of the said pair the respective reusable male and female molds are mated to form mold cavities defining the shape of the lenses to be manufactured.

The manufacturing stations comprise a mold changing station. The mold changing station is configured to be capable of removing a said mold from its mounting site on the frame of a said lens mold carrier and mounting a different mold to the frame at the said mounting site, or the said mold changing station is configured to change the rotational position of a said mold mounted to the frame of a said lens mold carrier, or both.

In accordance with a further aspect of the production line according to the invention, the mold changing station comprises a male mold exchange station for removing a said male mold from its mounting site on the frame of a said lens mold carrier, and for mounting a different male mold to the said mounting site.

In accordance with still a further aspect of the production line according to the invention, the mold changing station comprises a female mold exchange station for removing a said female mold from its mounting site on the frame of a said lens mold carrier, and for mounting a different female mold to the said mounting site.

In accordance with yet a further aspect of the production line according to the invention, the mold changing station comprises a toric axis setting station for changing and setting the rotational position of a said male or female mold mounted to the lens mold carrier.

Still in accordance with another aspect of the production line according to the invention, the production line further comprises an extraction and treatment module for the extraction and chemical treatment of the ophthalmic lenses manufactured in the manufacturing module.

The production line according to the invention allows for the identification of the type of lens actually inspected by reading the lens identification code that has been applied to the ophthalmic lens during manufacture. The lens identification code contains the information about the type of ophthalmic lens. The lens identification code may comprise one or more code portions which may be arranged at one or more predefined locations of the ophthalmic lens. In the following, for the sake of simplicity contact lenses (in particular soft contact lenses) will be discussed only as representing one important example of an ophthalmic lens that can be manufactured using the production line according to the invention. The lens identification code or lens identification code portions are typically arranged in a non-optical (peripheral) portion of the contact lens at predetermined locations.

By way of example, the lens identification code may comprise a first lens identification code portion indicative of the lens design (and may contain, for example, information on the base curve and on the spherical corrective power of the contact lens), a second lens identification code portion comprising a mark indicating the desired rotational orientation of the contact lens on the eye which is important for toric contact lenses, and in case of toric contact lenses the lens identification code may further comprise a third lens identification code portion comprising marks oppositely arranged relative to the center of the contact lens indicating both the orientation of the major cylinder axis (the minor cylinder axis is perpendicular to the major cylinder axis) as well as the amount of cylindrical add power that adds to the spherical power of the contact lens.

Alternatively, the lens identification code may consist of a single code portion containing the lot number only. In this case, the lot number contains all information about the respective type of contact lens so that the information about the type of lens can be obtained from a look-up table in which the lot numbers and the associated information about the type of contact lens are stored.

The lens identification code may be unique and is representative of the type of contact lens during this predetermined period of time. By way of example, the duration of such predetermined period of time may be from one week to three months. This means that during this predetermined period of time the same lens identification code cannot be used for a different type of contact lens, however, after that predetermined period of time is over, the same lens identification code can be used again, even for a different type of contact lens. If the same lens identification code is used again, it is again unique and representative for this different type of contact lens for the next predetermined period of time.

Alternatively, the lens identification code may be unique and is representative for the type of contact lens not only for a predetermined period of time, but may be representative for this type of contact lens independent of time. This means that each unique lens identification code is representative of one type of contact lens only. Accordingly, a different type of contact lens then mandatorily must have a different unique lens identification code.

Once the lens identification code is read and the type of contact lens is detected, it is determined whether the type of contact lens detected actually is the type of contact lens that is expected to be detected by the lens detection station at that time. In case a type of contact lens is detected in the lens detection station which is not expected to be detected at that time (a wrongly detected contact lens), corrective action is taken. For example, the wrongly detected contact lens is disposed of. In case the type of contact lens is detected in the detection station which is expected to be detected at that time (a correctly detected contact lens), this contact lens is further processed.

The lens detection station may be included in the inspection module of the production line according to the invention. In case a correctly detected contact lens has successfully passed all inspection steps, such contact lens may subsequently be transferred to and placed into a packaging shell provided in the packaging module. In such case it must be made sure that the contact lens is securely transferred and placed into the packaging shell, since in this case no additional detection of the type of contact lens is performed in the packaging module anymore. Such secure transfer of the contact lens can be reliably performed, for example, with a suitable gripper known in the art. A gripper suitable for this purpose is described, for example, in WO 2011/026868. It goes without saying that a correctly detected contact lens that has not successfully passed all inspection steps performed in the inspection module is disposed of.

For example, in case the inspection module comprises a cosmetic inspection station inspecting the ophthalmic lens for cosmetic defects such as flaws, tears, inclusions or bubbles, the cosmetic inspection station may be configured to include the lens detection station. By way of example, a suitable camera known in the art can be used for this purpose.

The lens detection station may also be included in the packaging module of the production line according to the invention. In this case the correctly detected contact lens having successfully passed all inspection steps is transferred to and placed into a packaging shell provided in the packaging module. Typically, the packaging module comprises a lens placement station where the contact lens is placed into the packaging shell.

Further downstream in the packaging module a liquid dosing station may be arranged for dosing a packaging liquid into the primary package containing the contact lens. Preferably, the lens detection station is arranged downstream of the lens placement station but upstream of the liquid dosing station, or it is arranged downstream of the liquid dosing station. A camera suitable to read the lens identification code can be used in the lens detection station, such cameras being known in the art.

The packaging module of the production line according to the invention may in particular comprise a shell providing station for providing the packaging shell, the lens placement station, the lens detection station, the liquid dosing station, a foil placement station for placing a foil on the packaging shell, a sealing station for sealing the foil to the shell, and a printing station for printing on the foil information about the lens contained in the sealed packaging shell. This information printed on the foil corresponds to the type of lens actually contained in the packaging shell.

The packaging module may further comprise a configuration station for intermediately storing a plurality of contact lenses. In case in the lens detection station it is detected that a type of contact lens is contained in the packaging shell which should not be contained in the said packaging shell, or in case it is detected that no contact lens is contained in the said packaging shell, then a contact lens of the type that should be contained is taken from the configuration station.

In the first case (wrong type of contact lens contained in the packaging shell), the contact lens of the type that should not be contained in the packaging shell is removed and replaced with the contact lens taken from the configuration station before the packaging shell is moved on to the liquid dosing station. In the second case (no contact lens contained in the packaging shell), the contact lens taken from the configuration station is added before the packaging shell is moved on to the liquid dosing station. Accordingly, in any event the contact lens contained in the packaging shell that is moved on to the liquid dosing station is that type of contact lens that should be contained in the packaging shell.

As has been mentioned already, a lens identification code is assigned to each contact lens, during manufacturing of the lens a lens identification code is applied to the lens which includes information indicative of the type of contact lens manufactured. This lens identification code may be a unique lens identification code which is representative of the specific type of contact lens. Or to say it in other words, the unique lens identification code is always the same for the same type of contact lens. The manufacturing module may be configured to assign to each lens a said unique lens identification code.

One option to apply such unique lens identification code to the contact lens is a printing station, in particular an inkjet printing station. For example, the manufacturing module may comprise molds for molding the contact lenses and a printing station, in particular an inkjet printing station, which may apply the unique lens identification code to one or both of the (male and female) molds used to manufacture the respective contact lens. The lens-forming material is then dispensed in the molds and the inkjet code printed to the mold or the molds is then transferred to the respective contact lens formed. Inks suitable for that purpose are known in the art. After transfer of the inkjet code from the mold to the lens, the molds are cleaned and dried and a new lens identification code is printed on the mold in the next production cycle.

Alternatively, the manufacturing module comprises molds permanently carrying the unique lens identification code as elevations formed on a molding surface of one or both of the molds used to form the respective contact lens. For example, one portion of the unique lens identification code may be formed on a molding surface of the male mold while another portion of the unique lens identification code may be formed on a molding surface of the female mold.

In accordance with an important aspect of the production line according to the invention, the manufacturing stations of the manufacturing module comprise a mold changing station. This mold changing station of the manufacturing module allows for a mold exchange, i.e. it allows for a removal of a mold from its mounting site on the frame of a lens mold carrier and for mounting of a different mold to the frame of the lens mold carrier at the said mounting site, and the said exchange can be performed while the lens mold carrier remains on the production line. A different mold in this regard is to be understood such that the different mold which is mounted to the frame of the lens mold carrier at the said mounting site is different in at least one geometrical property (for example the base curve radius or the front curve radius, depending on whether it is a male mold or a female mold) from the mold removed from the frame of the lens mold carrier at the said mounting site. A line clearance, i.e. a complete interruption of the production line, removal of all lens mold carriers from the production line in order to be able to subsequently place new lens mold carriers on the production line carrying different molds, is no longer required to perform the change. Since the mold exchange station is one of the stations of the manufacturing module which are arranged in the closed loop, it is possible to perform the exchange of the mold while production keeps on running. It is thus possible to start production of a new lot of contact lenses without the need to interrupt production ("lot change on the fly"), thus leading to a high increase in flexibility and production efficiency.

Only by way of example, let us assume that the lens mold carriers described further above are used each comprising the frame having the fourteen mounting sites, and that for each of the lens mold carriers transported through the manufacturing stations of the manufacturing module at the same mounting site the same type of mold (i.e. male or female) is mounted to the frame. If a lot change is to be performed, in the mold changing station the mold mounted to the frame of the respective lens mold carrier at let us say mounting site number one is removed from the frame of the respective lens mold carrier and a new mold is mounted to the frame at the said mounting site number one instead. Once the next lens mold carrier enters the mold changing station, the same exchange operation is performed at mounting site number one of the next lens mold carrier, and so on, until the molds at mounting site number one of all lens mold carriers transported through the manufacturing module have been exchanged (although for lots smaller than the total number of lens mold carriers transported through the manufacturing module even that is not necessary). The lot change is then completed. Production of the new lot of lenses already starts once the first lens mold carrier having the new mold mounted to the carrier at mounting site number one reaches a dosing station arranged downstream of the mold changing station where a lens forming material is dosed into the mold. Since all subsequent lens mold carriers reaching the dispensing station have the same new mold arranged at mounting site number one, too, production of the new lot of lenses is continued until the next mold exchange is performed at mounting site number one.

It goes without saying that the mold exchange described above at mounting site number one of a lens mold carrier has been described by way of example only. It is of course also possible to change the molds at any other mounting site of the lens mold carrier. Also, it is possible to exchange the molds at different mounting sites of a lens mold carrier at the same time, for example it is possible to exchange the molds at mounting sites number one and three at the same time. In the extreme, it is even possible to exchange the molds at each of the fourteen mounting locations at the same time, meaning that production of fourteen new lots of lenses is started at the same time.

Alternatively, instead of performing a lot change on the fly in the mold changing station by exchanging a mold (i.e. by removing a mold from the frame at a particular mounting site and mounting a new mold at the said particular mounting site), it is also possible to perform a lot change on the fly by changing the rotational position of the mold (in case the mold is not rotationally symmetrical as this is the case e.g. in the production of toric lenses). Change of the rotational position of the mold means, that the mold is not removed from its mounting site on the frame of the lens mold carrier but that the mold is only rotated while it remains mounted to the frame of the lens mold carrier.

And although the mold is not exchanged, due to the mold not being rotationally symmetrical a new lot of lenses is produced after rotation of the mold. This can be easily understood when glancing at toric lenses. For toric lenses, the two main axes of the toric lenses are typically arranged perpendicular relative to each other. If this arrangement of the two main axes is angularly rotated (by rotating the mold) a different toric lens is produced as the arrangement of the two main axes is different after rotation (new toric axis setting). Also, it is again possible to change the toric axis setting of two or more molds at different mounting sites at the same time, similar to what is discussed above with reference to the mold exchange.

Of course, combinations of mold exchange and changes in rotational position (toric axis setting) can be performed, i.e. a new mold may be mounted to the frame at a particular mounting site with the toric axis setting being different from the toric axis setting of the mold that has been exchanged. Also, this can be performed at different mounting sites of the lens mold carrier at the same time.

As is evident, a lot change on the fly can be performed either by exchanging a male mold in a male mold exchange station, or by exchanging a female mold in a female mold exchange station, or both. Toric axis setting (i.e. rotation of the male or female mold) can be performed in a toric axis setting station.

In each case in which a new lot of contact lenses is started, a lens identification code which is indicative of the respective new type of contact lens manufactured is applied to the respective contact lenses, be it in form of a code that is printed onto the molds such as an inkjet code or be it in form of a permanent code which is present on the molds.

The respective code is then read from the contact lens manufactured in order to detect the type of contact lens as described above. For example, in case a lot change on the fly has been performed the production line knows when the first contact lens of the new lot is expected to arrive at the lens detection station. In case the lens detection station then actually detects the contact lens to be of the type of the new lot of contact lenses, the lot change on the fly has been successfully performed. This is particularly advantageous for the production of smaller lots of contact lenses, since downtime of the production line can thus be completely avoided.

In principle, this allows for a maximum number of lots concurrently manufactured by the production line which corresponds to the number of lens mold carriers times the number of mounting sites per lens mold carrier.

In case the contact lenses manufactured are made of a material which must be extracted and/or coated before the contact lenses can be worn on the eye (e.g. soft contact lenses made from a silicone hydrogel material), the production line may comprise an extraction and treatment module for the extraction and treatment of the contact lenses manufactured in the manufacturing module. For example, solvents and non-polymerized and/or non-crosslinked lens forming material as well as other unwanted substances can be extracted from the manufactured contact lenses in one or more extraction baths of the extraction and treatment module, whereupon a coating can be applied to the extracted contact lenses in one or more coating baths of the extraction and treatment module in order to increase the lubricity of the contact lenses (or contact lens surfaces).

Further advantageous aspects will become apparent from the following description of embodiments of the invention with the aid of the drawings in which:

FIG. 5 shows a perspective view from above of the mold unit shown in FIG. 4;

FIG. 6 shows a perspective view from below of the mold unit shown in FIG. 4;

FIG. 13 shows a contact lens comprising an embodiment of a lens identification code containing information indicative of the type of contact lens.

Figure 1:
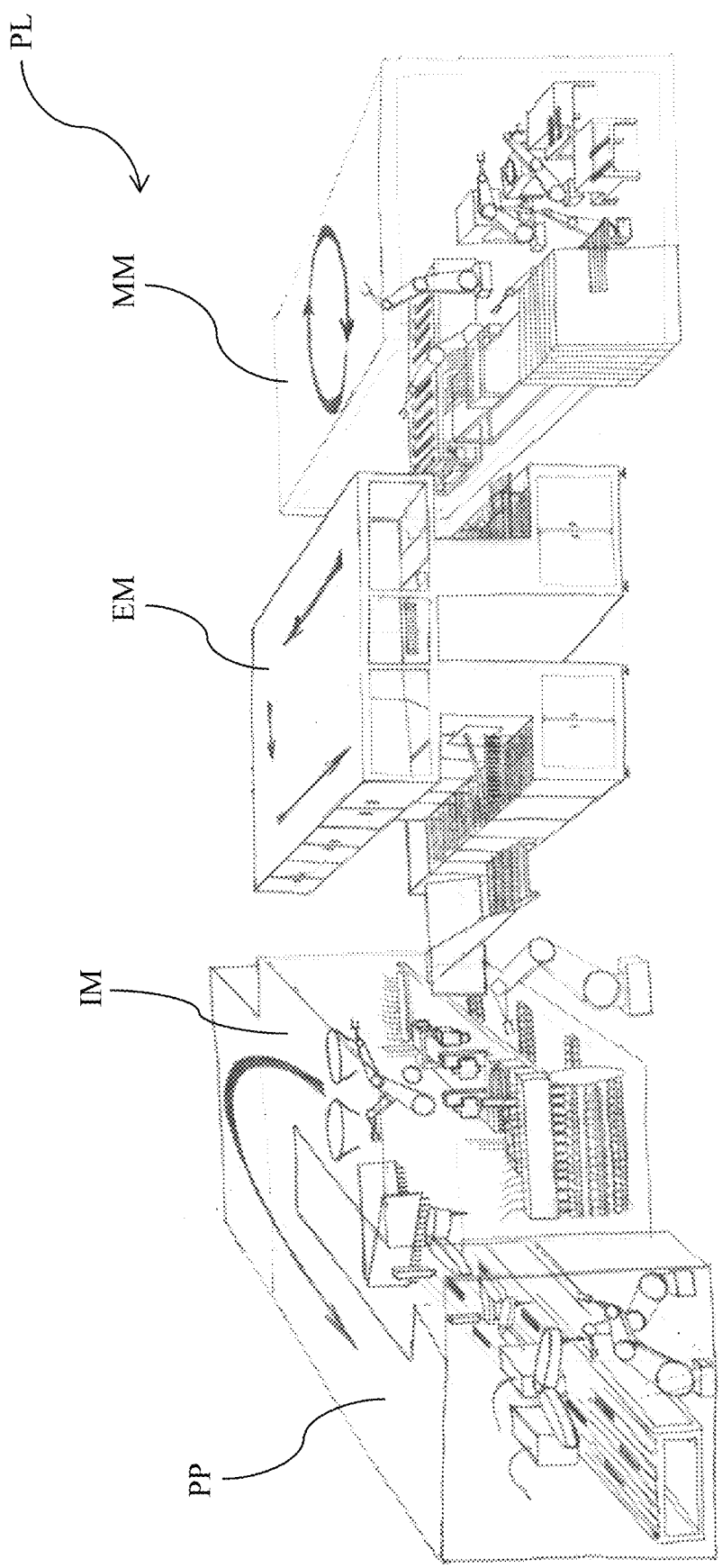
FIG. 1 shows an embodiment of a production line according to the invention, comprising a manufacturing module, an extraction and treatment module, an inspection module, and a packaging module.

In FIG. 1 an embodiment of a production line PL according to the invention for the production of contact lenses, for example soft contact lenses made of a silicone hydrogel material, is shown. Production line PL comprises a manufacturing module MM, an extraction and treatment module EM (in the following referred to as "extraction module" only for the sake of simplicity), an inspection module IM, and a packaging module PP for the primary packaging of the contact lenses. The interfaces between the individual modules MM, EM, IM and PP of production line PL, i.e. the locations where the contact lenses are transferred from a preceding module to a subsequent module, are arranged at fixed locations so that in case changes are performed within one or more of the individual modules MM, EM, IM and PP this does not affect the general architecture of the production line. Such changes in the individual modules may be caused by process changes, for example when new contact lenses are produced using a different lens forming material. By the modular architecture of the production line PL, the flexibility of the production line is increased significantly, facilitating the introduction and production of new contact lenses. In such case, the change is performed in the respective individual module while the general architecture of the production line including the locations of the interfaces remains unchanged.

In the manufacturing module MM, the manufacture of the contact lenses is performed. The manufactured contact lenses are subsequently transferred from the manufacturing module MM to the extraction module EM where unwanted substances, for example non-polymerized and/or non-cross-linked lens forming material as well as solvents, are extracted from the contact lenses, and where the contact lenses may be further chemically treated. For example, a coating may be applied to the extracted contact lenses in order to increase their lubricity. The extracted and chemically treated contact lenses are subsequently transferred from the extraction module EM to the inspection module IM, where the contact lens is inspected as to whether it is acceptable for being packaged and distributed to customers. Once the contact lenses have been determined by the inspection module IM as being acceptable, they are transferred from the inspection module IM to the (primary) packaging module PP. Contact lenses which are determined by the inspection module IM as not being acceptable are disposed of. The acceptable contact lenses transferred to the (primary) packaging module PP are packaged in primary packages. The primary packages containing the contact lenses leaving the packaging module PP are then placed in an autoclave, and once autoclaved they are forwarded for secondary packaging.

As is already indicated in FIG. 1 schematically by the arrows and as is discussed in more detail further below, the manufacturing module MM comprises a plurality of manufacturing stations which are arranged in a closed loop, and one of these manufacturing stations is part of the interface between the manufacturing module MM and the extraction module EM where the manufactured contact lenses are transferred from the manufacturing module MM to the extraction module EM.

By way of example, in the embodiments described the molds are arranged in mold units as will become apparent from the description below (although in general the molds can also be directly mounted to the lens mold carrier or in a manner other than through the mold unit). In the manufacturing module MM, a plurality of lens mold carriers are transported through the individual manufacturing stations. The lens mold carriers may be embodied in the manner shown in WO 2015/078798. One embodiment of such a lens mold carrier 1 (comprising female mold units) is described in the following with the aid of FIG. 4, FIG. 5 and FIG. 6.

Lens mold carrier 1 comprises a frame 10 which extends in a plane and comprises a plurality of individual compartments 100. Each of the compartments 100 is bounded by compartment walls 101, 102, 103, 104. In addition, in each compartment 100 there is an angled wall portion 105 arranged in one of the corners of the respective compartment 100.

Figure 4:
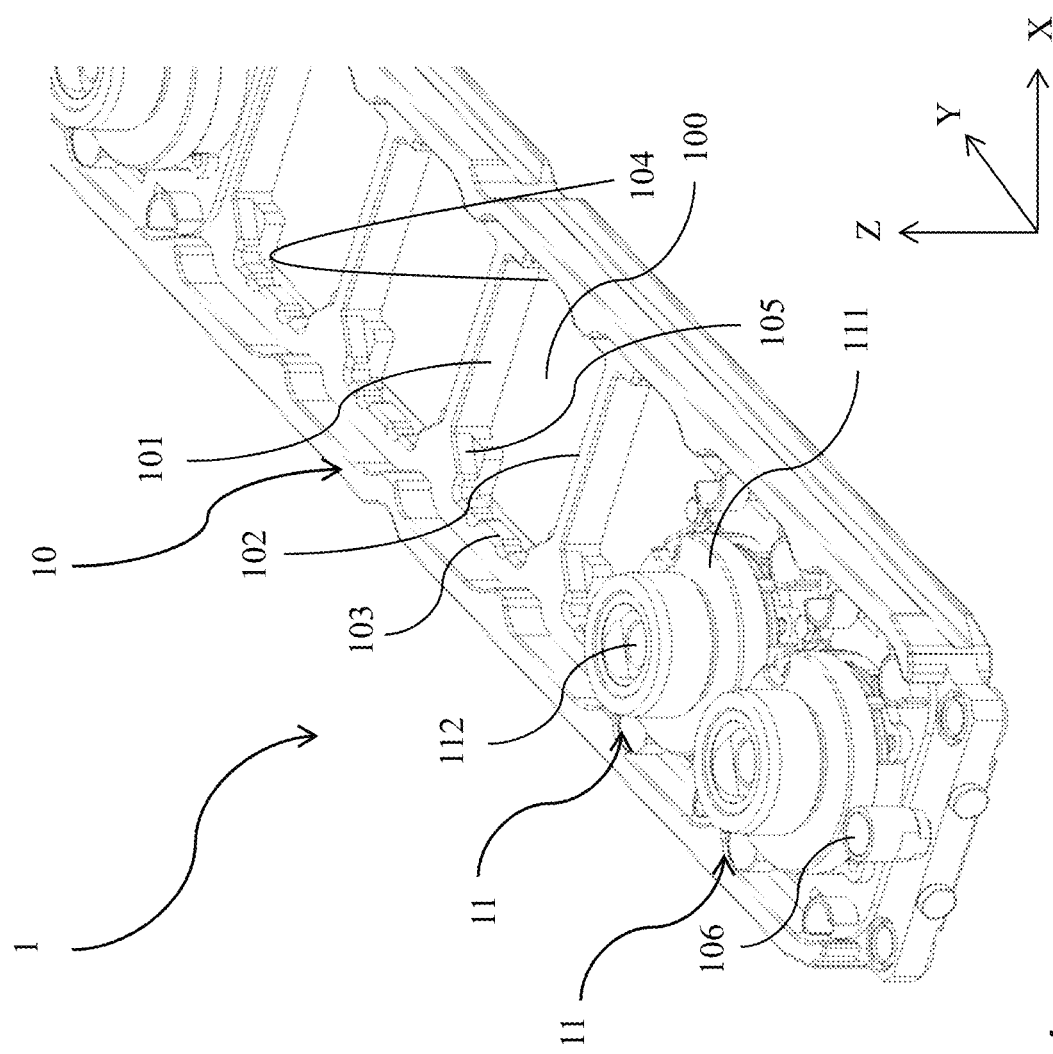
FIG. 4 shows a perspective view of a lens mold carrier including two mold units comprising female molds which are arranged at their mounting positions in compartments of a frame of the lens mold carrier.

As is shown in FIG. 4, in each of the two foremost compartments 100 of frame 10 a female mold unit 11 is arranged. Female mold unit 11 comprises an adapter piece 110 (see FIG. 5) preferably made of a thermoplastic material, and a sleeve 111. A female lens mold 112 is fixedly arranged in sleeve 111 which itself is fixedly arranged in adapter piece 110.

Sleeve 111 has a generally cylindrical shape. At its front end sleeve 111 extends over female lens mold 112, and this front end of sleeve 111 comprises a chamfered portion 1110 for engaging with a corresponding rounded front portion of the sleeve of a male mold unit (see further below) in order to facilitate mating of the male and female mold units. Sleeve 111 further comprises a recess 1111 into which a fixation bracket 114 engages. Fixation bracket 114 is fixedly mounted to a post 1100 projecting from the front face of adapter piece 110 with the aid of a screw 1101 and secures sleeve 111 against rotation.

Sleeve 111 comprises two or more circumferentially running grooves 1112. Two fixation brackets 115 (see FIG. 6) engage into one of the circumferentially running grooves 1112 at opposite sides. At its back end, sleeve 111 is provided with a centrally arranged glass disk 1113, as this is well-known in the art.

Adapter piece 110 further comprises a mold identifier 1104 comprising a transponder which is arranged in a stub projecting from the front face of adapter piece 110. The transponder comprises an RFID which can be read automatically and which contains information allowing to identify the female mold 112 of the respective female mold unit 11. Adapter piece 110 further comprises three stubs 1105 projecting from the front face of adapter piece 110. These stubs 1105 have the same height as the stub of mold identifier 1104.

Adapter piece 110 further comprises two pairs of resilient latches 113 (see FIG. 5). In order to securely mount female mold unit 11 to one of the compartments 100 of frame 10, female mold unit 11 is pressed from above into compartment 100 until the resilient latches 113 of adapter piece 110 snap beneath and engage the compartment walls 103, 104 of frame 10. Once this engagement has occurred, female mold unit 11 is floatingly arranged in the respective compartment 100 of frame 10 Since .female mold unit 11 is floatingly arranged in compartment 100, limited movement of the adapter piece 110 is possible within compartment 100 both in a translation plane (a plane parallel to or coincident with the plane of the lens mold carrier, i.e. in x,y-direction) as well as in a direction perpendicular thereto (z-direction). On the other hand, female mold unit 11 is securely connected to frame 10 allowing for handling and transfer of the female mold unit 11 (including female mold 112) in the manufacturing module.

As is evident, the movement of adapter piece 110 (and thus of female mold unit 11) within compartment 100 in z-direction is limited by the resilient latches 113. Movement of the adapter piece 110 in the translation plane is limited by six abutment posts 116 arranged on the rear face of adapter piece 110 and projecting therefrom, with one of the abutment posts 116 being arranged in a specific manner to allow for mounting of adapter piece 110 to the frame 10 in the respective compartment 100 only in one orientation (the correct orientation). The limited movement of adapter piece 110 within compartment 100 in the translation plane may amount up to 0.3 mm in the x-direction and up to 0.3 mm in the y-direction (in each of the positive and negative x- or y-direction, respectively; i.e. ±0.3 mm).

As can be seen from FIG. 4, frame 10 is provided with a carrier identifier 106 comprising a transponder which is arranged in a stub projecting from the front face of frame 10. The transponder comprises an RFID which can be read automatically and which contains information allowing to identify the respective lens mold carrier 1 as well as information allowing to identify which female mold 112 is arranged in which compartment 100 of the frame 10 of lens mold carrier 1. With the aid of the carrier identifier 106 and the mold identifier 1104 it is always possible to identify at any time at any desired location in the manufacturing line which mold is arranged in which compartment of which lens mold carrier. This allows for an association of the lens mold to the respective contact lenses produced with that lens mold which may be advantageous, for example, for quality monitoring and tracking purposes.

For further details of lens mold carrier 1 it is referred to the description of the afore-mentioned WO 2015/078798.

A further embodiment of such lens mold carrier, also described in detail in WO 2015/078798 is described in the following with the aid of FIG. 7, FIG. 8, FIG. 9 and FIG. 10 (an embodiment comprising male mold units). Many details of this further embodiment of the lens mold carrier 2 and of its components are similar to those of the first embodiment of the lens mold carrier 1, so that not each and every detail is explained again. As a general rule, the leading numeral "1" of the reference signs used for the embodiment of the lens mold carrier described above is replaced with the leading numeral "2" in the further embodiment of the lens mold carrier described below.

Accordingly, lens mold carrier 2 comprises a frame 20 which extends in a plane and comprises a plurality of individual compartments 200. Each of the compartments 200 is bounded by compartment walls 201, 202, 203, 204. In addition, in each compartment 200 there is an angled wall portion 205 arranged in one of the corners of the respective compartment 200.

Figure 7:
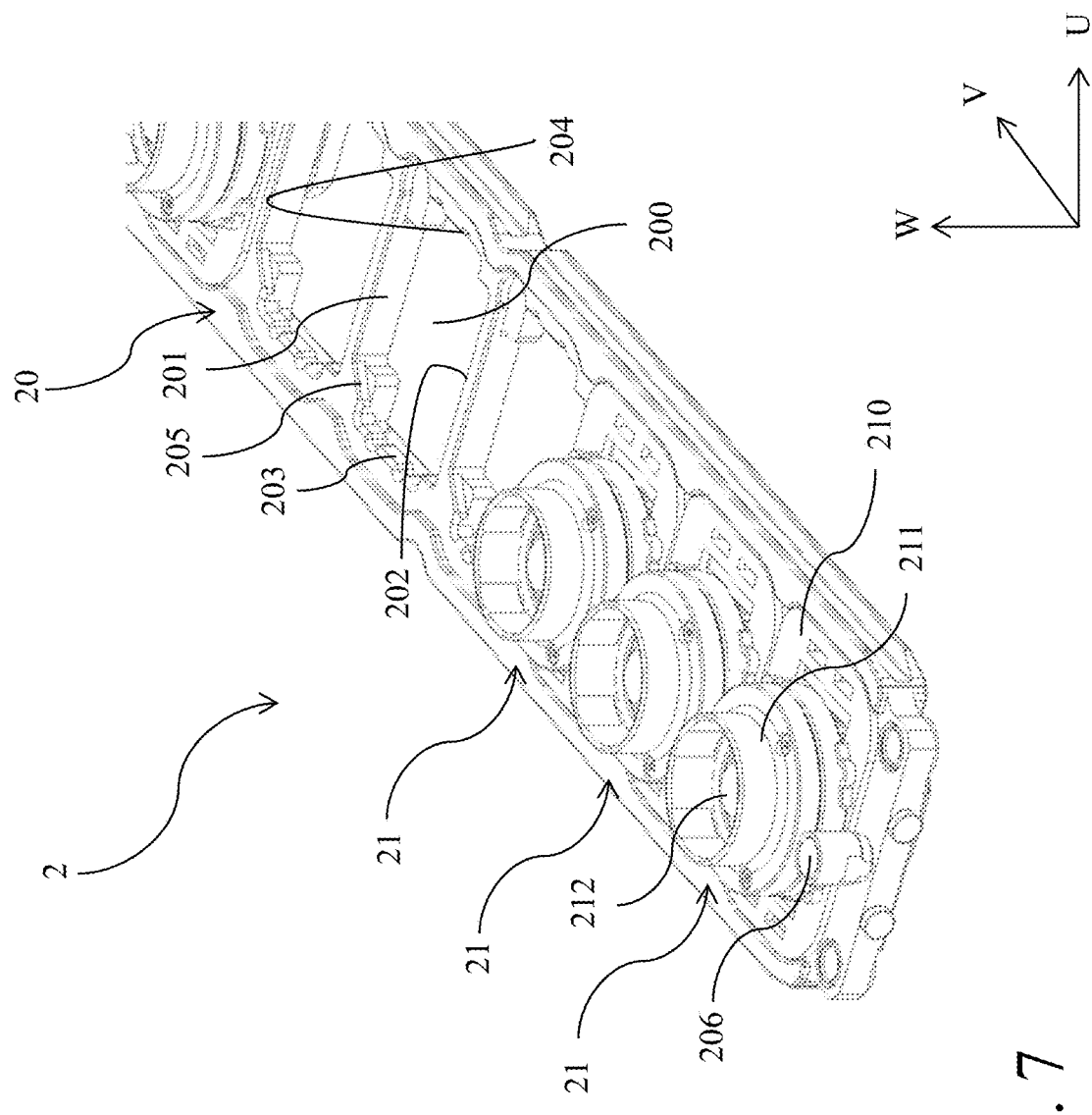
FIG. 7 shows a perspective view of a lens mold carrier including three mold units comprising male molds which are arranged at their mounting positions in compartments of a frame of the lens mold carrier.

As is shown in FIG. 7, in each of the three foremost compartments 200 of frame 20 a male mold unit 21 is arranged. Male mold unit 21 comprises an adapter piece 210, preferably made of a thermoplastic material, and a sleeve 211. A male lens mold 212 is fixedly arranged in sleeve 211. Sleeve 211 is arranged in a central opening of adapter piece 210 and is lockingly connected to the adapter piece 210 at a fixed angular position, but can be rotated relative to adapter piece 210 to get lockingly connected to the adapter piece 210 at another fixed angular position, as will be explained in more detail below.

Figures 8, 9:
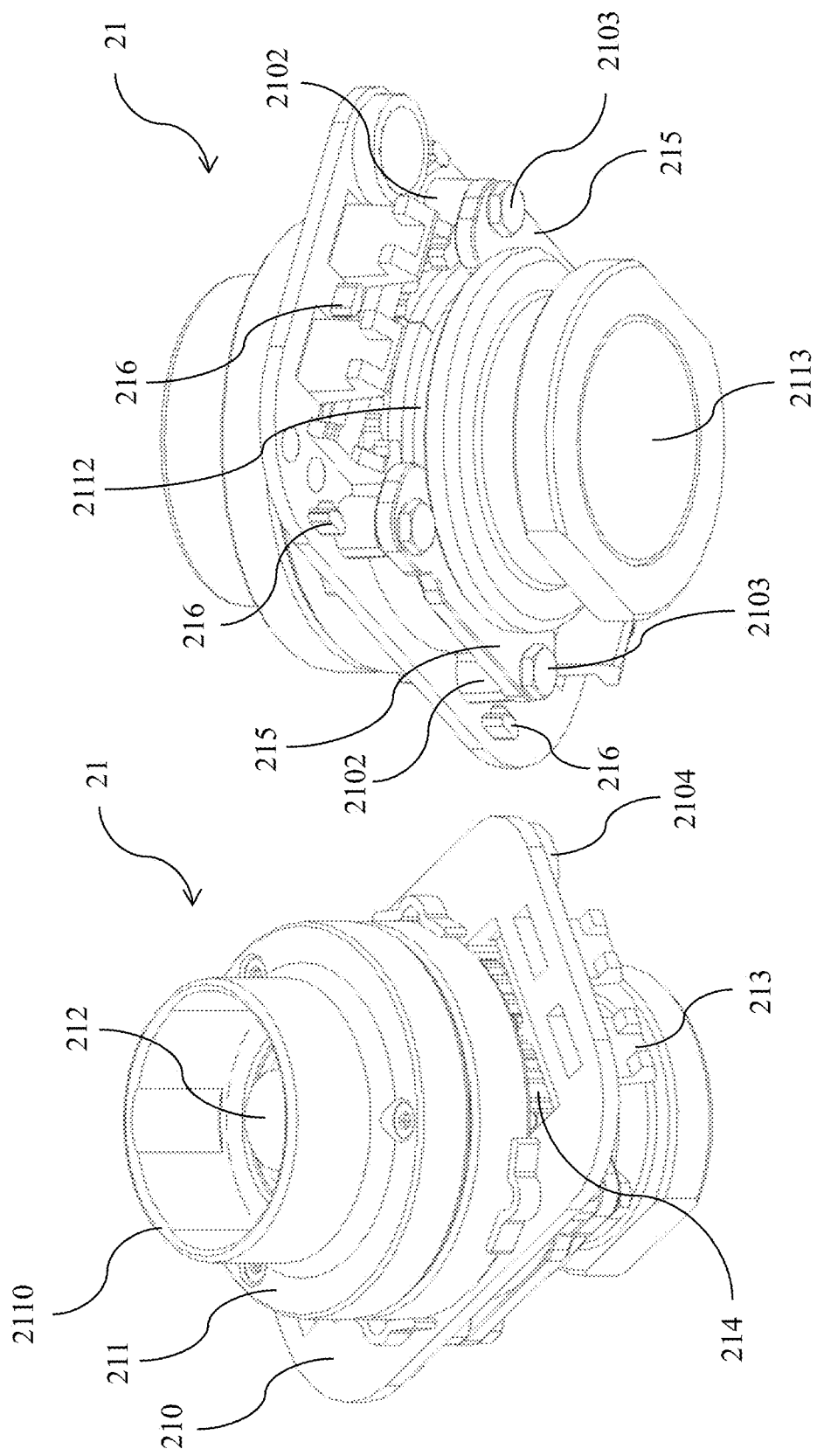
FIG. 8 shows a perspective view from above of the mold unit shown in FIG. 7.
FIG. 9 shows a perspective view from below of the mold unit shown in FIG. 7.
Figure 10:
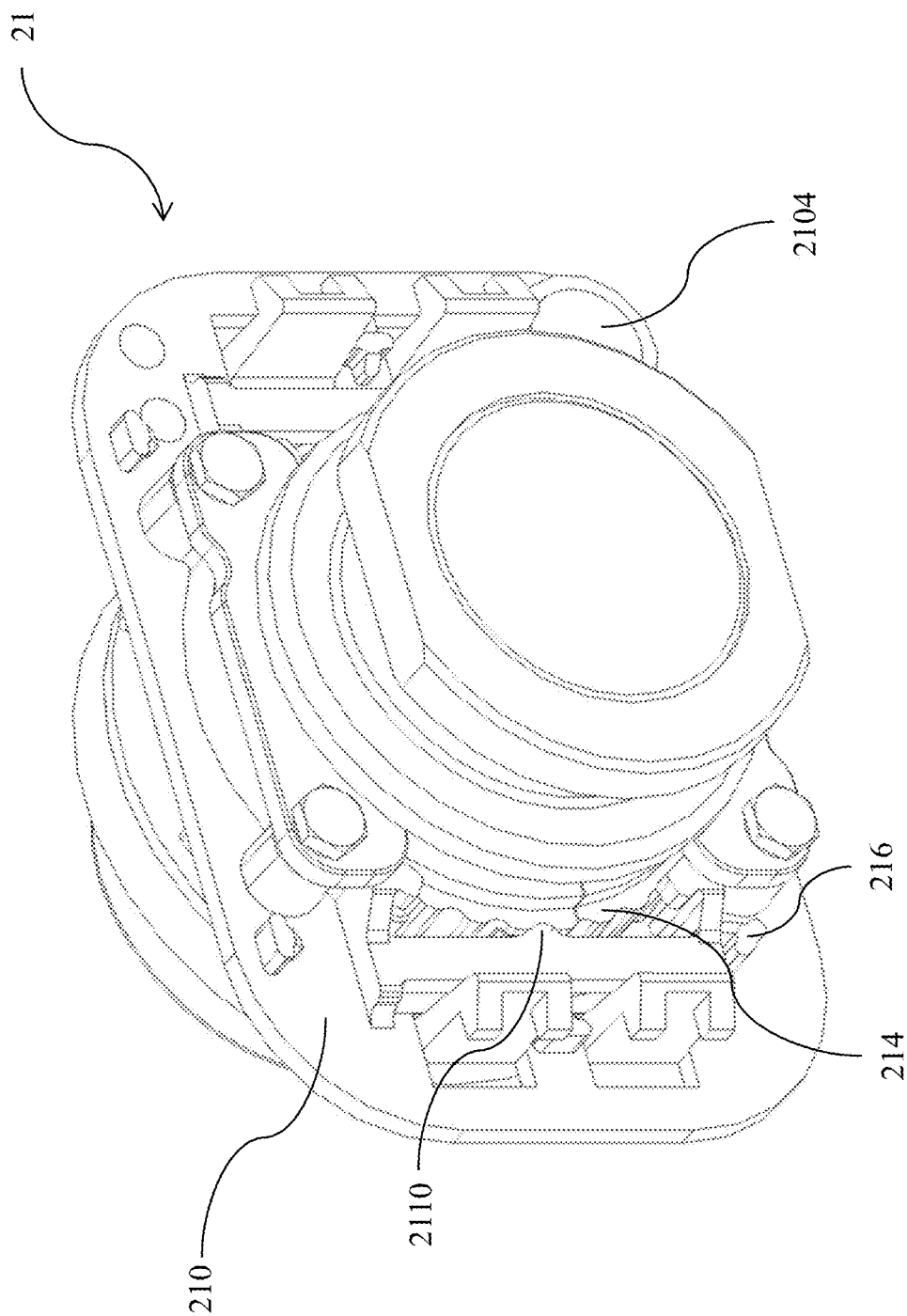
FIG. 10 shows the mold unit of FIG. 9 and the adjusting ring lockingly connected to the adapter piece of the mold unit.

Sleeve 211 has a generally cylindrical shape (see FIG. 8). At its front end sleeve 211 extends over male lens mold 212, and this front end of sleeve 211 of male mold unit 21 comprises a rounded portion 2110 for engaging with the chamfered portion 1110 of sleeve 111 of the female mold unit 11 (see FIG. 5) in order to facilitate mating of the male and female mold units. Sleeve 211 comprises two circumferentially running grooves 2112. A toothed adjusting ring 214 (see FIG. 8, FIG. 10) comprising two assembled ring pieces is arranged in one of these grooves 2112 (see FIG. 9) as well as two fixation brackets 215 which engage into the same groove 2112 at opposite sides. Adjusting ring 214 is firmly attached to sleeve 211 so that it can be rotated only together with sleeve 211 relative to adapter piece 210 in a plane parallel to the plane of the lens mold carrier 2 (u-v plane). However, rotation of adjusting ring 214 is only possible between fixed angular positions, at which the toothed adjusting ring 214 lockingly engages with two fixedly arranged locking teeth 2110 which are provided on locking elements that form part of the adapter piece 210 (see FIG. 10), these two locking teeth 2110 being arranged at opposite sides. Thus, adjusting ring 214 is lockingly connected to the adapter piece 210 at fixed angular positions. This is advantageous in the production of toric contact lenses since it allows, with the aid of a handling system, to automatically change the angular position of the axes of (toric) male mold 212 by rotating adjusting ring 214 (and together with it male mold unit 21 including male mold 212) by one or more fixed angular increments relative to adapter piece 210, and to then have it lockingly connected with adapter piece 210 again at a different angular position, so that a toric contact lens with a different arrangement of the axes can be produced. At its back end, sleeve 211 is provided with a centrally arranged glass disk 2113 allowing UV-light to pass through to the mold for curing the lens forming material, as this is well-known in the art.

Adapter piece 210 further comprises a mold identifier 2104 comprising a transponder which is arranged in a stub projecting from the rear face of adapter piece 210. The transponder comprises an RFID which can be read automatically and which contains information allowing to identify the male mold 212 of the respective male mold unit 21.

Adapter piece 210 further comprises two pairs of resilient latches 213. In order to securely mount male mold unit 21 to the frame 20 in one of the compartments 200, male mold unit 21 is pressed from above into compartment 200 until the resilient latches 213 of adapter piece 210 snap beneath and engage the compartment walls 203, 204 of frame 20. Once this engagement has occurred, male mold unit 21 is floatingly arranged in the respective compartment 200. Since male mold unit 21 is floatingly arranged in compartment 200, limited movement of the adapter piece 210 is still possible within compartment 200 both in a translation plane (which is a plane parallel to or coincident with the u-v plane) as well as in a direction perpendicular thereto (w-direction). On the other hand, male mold unit 21 is securely connected to frame 20 allowing for handling and transfer of the male mold unit 21 (including male mold 212) in the manufacturing module.

As is evident, the movement of adapter piece 210 (and thus of male mold unit 21) within compartment 200 in w-direction is limited by the resilient latches 213. Movement of the adapter piece 210 in the translation plane is limited by six abutment posts 216 arranged on the rear face of adapter piece 210 and projecting therefrom, with one of the abutment posts 216—that one in the lower left corner in FIG. 10—being arranged in a specific manner to allow for mounting of adapter piece 210 to the frame 20 in the respective compartment 200 only in one orientation (the correct orientation). The limited movement of adapter piece 210 within compartment 200 in the translation plane may amount up to 0.3 mm in the u-direction and up to 0.3 mm in the v-direction (in each of the positive and negative u- or v-direction, respectively; i.e. ±0.3 mm).

As can be seen from FIG. 7, frame 20 is provided with a carrier identifier 206 comprising a transponder which is arranged in a stub projecting from the front face of frame 20. The transponder comprises an RFID which can be read automatically and which contains information allowing to identify the respective lens mold carrier 2 as well as information allowing to identify which male mold 212 is arranged in which compartment 200 of the frame 20 of lens mold carrier 2. With the aid of the carrier identifier 206 and the mold identifier 2104 it is always possible to identify at any time at any desired location in the manufacturing line which mold is arranged in which compartment of which lens mold carrier. This allows for an association of the lens mold to the respective contact lenses produced with that lens mold which may be advantageous, for example, for quality monitoring and tracking purposes.

For further details of lens mold carrier 2 it is referred to the description of the afore-mentioned WO 2015/078798. The embodiment of lens mold carrier 1 and the embodiment of lens mold carrier 2 described above can be used in the manufacturing module MM of the production line PL according to the invention, an embodiment of which is already described with respect to FIG. 1.

Figure 2:
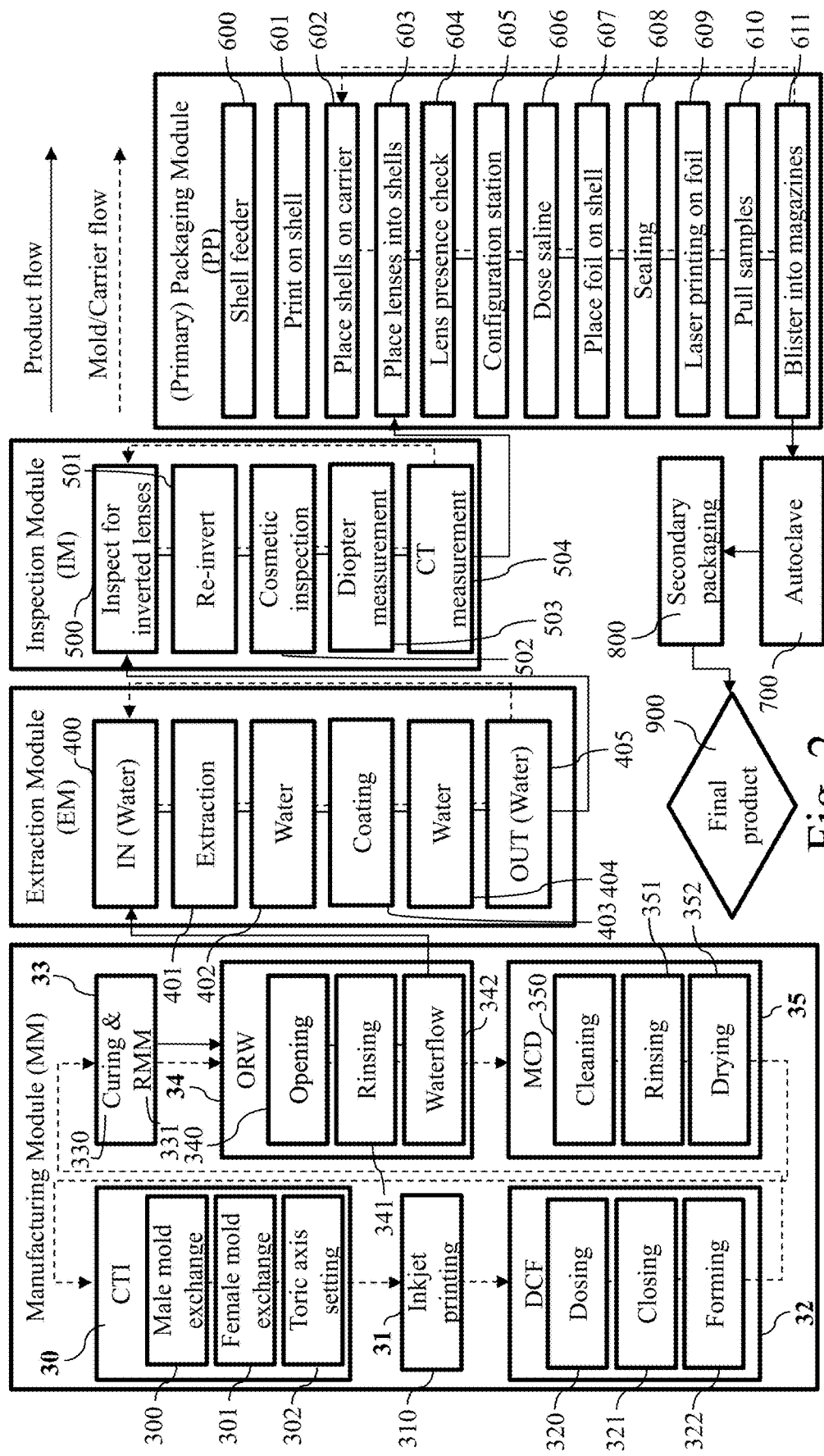
FIG. 2 shows a diagrammatic representation of an embodiment of the production line according to the invention showing the individual stations.

In FIG. 2 a diagrammatic representation of an embodiment of the production line PL is shown showing the individual stations of the manufacturing module MM, the extraction module EM, the inspection module IM, and the (primary) packaging module PP.

In the manufacturing module MM, individual manufacturing stations are grouped together to form a plurality of individual manufacturing units, as is discussed below in more detail. A first manufacturing unit 30 labelled "CTI" comprises a male mold exchange station 300, a female mold exchange station 301 and a toric axis setting station 302.

In the male mold exchange station 300, in order to effect a lot change on the fly, for example at mounting site number one (corresponding to the foremost compartment 200 of lens mold carrier 2), it is possible to remove a male mold unit 21 from the foremost compartment 200 of lens mold carrier 2 and to mount a different male mold unit into the said foremost compartment 200 from which the male mold unit 21 has been removed. Alternatively, in the female mold exchange station 301, in order to effect a lot change on the fly, for example at mounting site number one (corresponding to the foremost compartment 100 of lens mold carrier 1), it is possible to remove a female mold unit 11 from the foremost compartment 100 of lens mold carrier 1 and to mount a different female mold unit to the said compartment 100. Of course, it is also possible to remove both the male mold unit 21 and the female mold unit 11 from the respective foremost compartment of the respective lens mold carrier to effect a lot change on the fly at mounting position number one. Further alternatively, in order to effect a lot change on the fly by producing a different toric contact lens, in the toric axis setting station 302 it is possible to rotate adjusting ring 214 (and together with it the male mold 212) by one or more fixed angular increments relative to adapter piece 210, and to then have it lockingly connected with adapter piece 210 again at a different angular position, so that a toric contact lens with a different arrangement of the axes can be produced. The first manufacturing unit labelled "CTI" will be explained in more detail further below.

Lens mold carrier 1 and lens mold carrier 2 are then transferred from manufacturing unit 30 ("CTI") to the next manufacturing station.

The next manufacturing station in the embodiment of the manufacturing module M of the production line PL is an inkjet printing station 310. In the inkjet printing station, a unique lens identification code, for example a unique code of ink dots or any other suitable type of code is printed onto a mold, e.g. onto the female mold. This unique lens identification code is the lens identification code that is indicative of the type of contact lens to be produced. This unique lens identification code is applied in each subsequent production cycle to the mold surface.

The ink dots printed on the mold are later transferred to the material forming the contact lens, for example they are embedded into the material forming the contact lens. The information contained in the unique lens identification code may comprise the following information (without being exhaustive): Lens material, lens diameter, base curve radius, spherical corrective power, angle of the main cylinder axis (if any), additional cylindrical power (if any), etc.

It is also possible that the lens identification code is applied to the contact lens through embossing, that is to say, one or both of the molds may have projections or elevations in a non-optical peripheral portion of the mold or molds which may produce corresponding embossments in the contact lens in a non-optical peripheral portion of the contact lens. Also combinations of embossing and inkjet printing are possible. An example of such lens identification code will be discussed in more detail below in with respect to FIG. 13.

It is obvious, therefore, that the inkjet printing station 310 is optional only as the code can be provided in a different manner, for example in the embossed form.

Lens mold carrier 1 and lens mold carrier 2 are then transferred to a second manufacturing unit 32.

Second manufacturing unit 32 labelled "DCF" comprises a dosing station 320, a closing station 321 and a forming station. In the dosing station 320 a predetermined quantity of lens forming material is dispensed (dosed) into the female molds 112 of the female mold units 11 of lens mold carrier 1. Thereafter, in the closing station 321 assigned pairs of lens mold carriers 1 and 2 are mated, so that upon mating lens mold carrier 1 and lens mold carrier 2, the female molds 112 of lens mold carrier 1 and the respective male molds 212 of lens mold carrier 2 are mated to form mold cavities. All lens mold carriers 1 comprise female mold units 11 with female molds 112 while the respective assigned lens mold carriers 2 comprise male mold units 21 with male molds 212. In the forming station 322, the respective male molds 212 and female molds 112 are moved into an intermediate closed position, in which the molds are not yet in their final closed position.

In the following, an example is described how lens mold carrier 1 and lens mold carrier 2 may work together in the manufacturing unit 32. As has been described above, the compartments 100 in frame 10 of lens mold carrier 1 and the compartments 200 in frame 20 of corresponding lens mold carrier 2 are very precisely arranged, and adapter piece 110 of female lens mold unit 11 is floatingly arranged in compartment 100 while adapter piece 210 of male lens mold unit 21 is floatingly arranged in compartment 200. Due to the precise arrangement of the compartments 100 and 200 of the frames 10 and 20 the sleeves 111 and 211 are already coarsely aligned as the lens mold carrier 2 is moved towards lens mold carrier 1. During mating, the precise alignment of each pair of associated male mold units 21 and female mold units 11 is then performed automatically: As the rounded portion 2110 of the front end of sleeve 211 comes into contact with the chamfered portion 1110 of the front end of sleeve 111 during mating the lens mold carrier 1 carrying the female mold units 21 and the lens mold carrier 2, either one adapter piece or both adapter pieces of male mold unit 21 and female mold unit 11 move within their respective compartments until the sleeves are precisely aligned whereby the molds are precisely aligned with the aid of the cylindrical outer surface of sleeve 111 that extends over the female mold 112 and the inner surface of sleeve 211 that extends over the male mold 212. This happens with each pair of associated male mold units 21 and female mold units 11 and is possible due to the floating arrangement of the adapter pieces within the respective compartments. All male mold units 11 and female mold units 21 (including the male molds 212 and female molds 112) are then precisely aligned. The lens mold carriers are then further moved towards each other until the molds are closed, with the individual molds being perfectly aligned. Thereafter, the sleeves may be moved a small distance apart again so that the molds are in the intermediate closed position which is not the final closed position.

The mated lens mold carriers 1, 2 are then transferred to a third manufacturing unit 33.

Third manufacturing unit 33 comprises a curing station and a relative mold movement station 330, in which the lens forming material is cured, for example with the aid of UV-light. As is well-known, during UV-light curing the lens forming material is polymerized and/or crosslinked to form the contact lens, however, during curing shrinkage of the lens forming material is known to occur. As both the female molds 112 and the male molds 212 are reusable molds typically made of glass (e.g. quartz glass or any other suitable glass known in the art) the molds themselves cannot deform to compensate for the shrinkage. Therefore, a relative mold movement is performed such that the male and female molds are moved relative to each other from the afore-mentioned intermediate closed position to the final closed position in accordance with a predetermined movement profile which takes the shrinkage process into account, so that the shape of the contact lens is determined by the shape of the male and female molds in the final closed position. Such relative mold movement of the male and female molds is known in the art and can be performed in different ways, as is described, for example, in WO 2011/045397.

The mated lens mold carriers 1, 2 containing the formed contact lenses are then transferred to a fourth manufacturing unit 34.

Fourth manufacturing unit 34 labelled "ORW" comprises an opening station 340 in which the mated lens mold carriers 1, 2 are separated thus opening the molds, a rinsing station 341 for rinsing away excess lens forming material, and a lens removal station 342 labelled "Waterflow" for removal of the contact lens from the mold and for transferring the contact lens from the manufacturing module MM to the extraction module EM. The lens removal station has been labelled "Waterflow" as removal of the contact lens from the mold and transfer of the contact lens from the manufacturing module MM to the extraction module EM can be performed with the aid of a flow of fluid, for example water, as this is known in the art and described, for example, in WO 2008/116856.

Once the contact lenses are transferred from the manufacturing module MM to the extraction module EM, the lens mold carrier 1 with the female mold units 11 comprising the female molds 112 and the lens mold carrier 2 with the male mold units 21 comprising the male molds 212 are transferred to a fifth manufacturing unit 35.

Fifth manufacturing unit 35 labelled "MCD" comprises a mold cleaning station 350 for cleaning the molds, a rinsing station 351 for a final rinse of the molds, and a subsequent drying station 352 for drying the molds, for example with the aid of air having a well-defined humidity of the drying air. The carrier 1 with the female mold units 11 and the cleaned, rinsed and dried female molds 112 as well as the carrier 2 with the male mold units 21 and the cleaned, rinsed and dried molds are then returned to the first manufacturing station labelled "CTI", thus closing the loop and starting the described lens manufacturing process for the next production cycle.

The material flow of the contact lens is indicated in FIG. 2 by continuous lines, whereas the flow of the lens mold carriers (or of the molds, respectively) in the manufacturing module MM, the flow of the contact lens carriers in the extraction module EM, the flow of the inspection cuvettes in the inspection module IM, and the flow of the packaging shell carriers in the packaging module PP is indicated by dashed lines.

The manufacturing module MM described above in connection with the diagrammatic representation in FIG. 2 is shown in FIG. 3 again in a more structure-related schematic representation showing the arrangement of the individual manufacturing units 30, 32, 33, 34 and 35, as well as the (optional) inkjet printing station 310 or unit 31. As can be seen, transfer robots 36 are arranged between the first manufacturing unit 30 labelled "CTI" and inkjet printing station 310 or unit 21, between inkjet printing station 310 or unit 31 and second manufacturing unit 32 labelled "DCF", between second manufacturing unit 32 labelled "DCF" and third manufacturing unit 33 labelled "RMM/UVL", between the third manufacturing unit 33 labelled "RMM/UVL" and fourth manufacturing unit 34 labelled "ORW", between fourth manufacturing unit 34 labelled "ORW" and fifth manufacturing unit labelled "MCD", and between fifth manufacturing unit 35 labelled "MCD" and first manufacturing unit labelled "CTI". Transfer robots 36 transfer lens mold carriers 1, 2 from one manufacturing unit to the next manufacturing unit. This configuration of the manufacturing module MM is advantageous as it is easily possible to make changes to the manufacturing module MM. For example, additional manufacturing stations or manufacturing units can be added to or manufacturing stations or manufacturing units can be removed from the manufacturing module MM, or the existing manufacturing stations can be rearranged at different locations within the manufacturing module MM. In each such case, it is only necessary to make the robots transfer the lens mold carriers to the location of the respective new location of the next manufacturing unit or manufacturing station. In the case of adding an additional manufacturing station or manufacturing unit to the manufacturing module MM, one or more additional robots are needed.

Turning back to FIG. 2, transfer of the contact lenses from the manufacturing module MM to the extraction module EM is performed in the removal station 342 labelled "Waterflow", as has been described above. The contact lenses are transferred through plastic tubes into containers waiting in a receiving station 400 of the extraction module EM for the contact lenses to arrive. As the lens mold carriers described above comprise fourteen molds each, fourteen contact lenses are produced at the same time. Accordingly, fourteen contact lenses are transferred from the manufacturing module MM to the extraction module EM at the same time. Consequently, fourteen containers are respectively provided in a receiving station for receiving the fourteen contact lenses transferred from the removal station 342 (labelled "Waterflow") of the manufacturing module MM. Containers suitable to transport the contact lenses through the different stations of the extraction module EM are known for example, from WO 2011/045384.

The manufacturing process performed in the manufacturing module MM typically is a cyclic process performed with a predetermined cycle time for all process steps. This holds for the extraction and treatment process performed in the extraction module EM, too. However, as the cycle time of the manufacturing process performed in the manufacturing module MM and the cycle time of the extraction and treatment process performed in the extraction module EM may be different, in order to account for such difference in cycle times an apparatus for transferring the contact lenses between the manufacturing module MM and the extraction module EM can be used as is disclosed in WO 2012/080468.

In the extraction module, the contact lenses are received in the afore-mentioned containers in a receiving station 400 labelled "IN (Water)" and are subsequently transported through different dipping baths. For that purpose, an apparatus as disclosed in WO 2011/045380 can be used, for example. The contact lenses contained in the containers are first transported from the receiving station 400 (labelled "IN (Water)") to an extraction station 401 (which may comprise one or more extraction baths) where unwanted substances, for example non-polymerized and/or non-crosslinked lens forming material as well as solvents, are extracted from the contact lenses. Thereafter, the contact lenses contained in the containers are again transported to a neutralization station 402 (labelled "Water") which may comprise one or more water baths. Subsequently, the contact lenses contained in the containers are transported to a coating station 403 (which may comprise one or more coating baths) for applying a coating to the contact lenses. Thereafter, the contact lenses contained in the containers are again transported to a neutralization station 404 (labelled "Water" again) before they are transported to a transfer station 405 (labelled "OUT (Water)") from where the contact lenses contained in the container are transferred from the extraction module EM to an inspection module IM for inspection as this is represented by the continuous line in FIG. 3 starting at the base of transfer station 405 and ending at the first inspection station of the inspection module IM. The containers of the extraction module EM are then returned to the receiving station 400 (labelled "IN (Water)") as is indicated by the dashed lines in FIG. 3.

Removal of the contact lenses from the containers at the transfer station 405 of extraction module EM and transfer of the contact lenses into inspection cuvettes waiting in the inspection module IM can be performed using a suitable gripper. Inspection cuvettes suitable for being used in the inspection module IM are known, for example, from WO 03/016855, while a gripper suitable for the transfer of the contact lenses from the containers of extraction module EM into the inspection cuvettes waiting in inspection module IM is disclosed in WO 2012/066060, for example.

In the inspection module IM, the contact lenses contained in the inspection cuvettes are first inspected in a first inspection station 500 of the inspection module IM as to whether or not the contact lenses are inverted. By way of example, such type of inspection can be performed in the manner described in WO 2015/036432. In case the result of this inspection is that a contact lens is inverted, the contact lens can be re-inverted in a second inspection station 501 of the inspection module in order to thereafter have the contact lens arranged in the inspection cuvette in the correct inversion state (i.e. the contact lens is non-inverted). Re-inversion of the contact lens can be performed in the manner described in WO 2009/103732, for example. Once in the proper inversion state, the contact lens is inspected for cosmetic defects such as bubbles, inclusions, edge defects (e.g. tears), etc., in a third inspection station 502 of the inspection module IM. This cosmetic inspection can be performed in the manner described in WO 2007/060173, for example. As one option, this third inspection station 502 (cosmetic inspection station) may be configured to include the lens detection station where the lens identification code is read and the type of contact lens actually inspected is detected, and where it is determined whether the lens actually inspected is of the type which is expected to be detected. This will be discussed in further detail below. In a subsequent fourth inspection station 503 (labelled "Diopter measurement"), the contact lens is inspected to determine its optical parameters such as the optical power. This can be performed in the manner described in WO 2014/049053, for example. Finally, in a fifth inspection station 504 (labelled "CT measurement") the contact lens is inspected to determine the central thickness of the contact lens, and this can be performed, for example, in the manner described in WO 2014/049050. The sequence of the inspection stations in inspection module IM is not limited to the sequence shown in FIG. 2, at least the three last inspection stations can be arranged in a different sequence (however, inspection of the contact lens should occur with the contact lens being in the proper inversion state). Also, in general the fourth inspection station 503 (labelled "Diopter measurement") and the fifth inspection station 504 (labelled "CT measurement") are generally optional, and if present they may be active only after certain occurrences during production, for example when a lot change is performed.

In case a contact lens has failed to pass one or more of the inspections performed in the third inspection station 502 ("Cosmetic inspection"), the fourth inspection station 503 ("Diopter measurement") or the fifth inspection station 504 ("CT measurement"), such contact lens is sorted out and discarded. Contact lenses that have passed all of the afore-mentioned inspection steps are transferred into a primary package waiting in a lens placement station of a (primary)

packaging module PP, as this is indicated by the continuous line. A primary package suitable for this purpose and comprising a packaging shell and a foil sealed to the top surface of the packaging shell is described, for example, in U.S. Pat. No. 5,609,246. The inspection cuvettes are cleaned and returned to the first inspection station 500 where contact lenses coming from the extraction module EM are transferred into the inspection cuvettes in the inspection module IM again, as this is indicated by the dashed lines.

In the (primary) packaging module PP, in a first packaging station 600 (labelled "Shell feeder") packaging shells are supplied. In a second, optional packaging station 601 (labelled "Print on shell") various information may be printed on the shell (such as, for example, date of production, contact lens data, etc.). Next, in a third packaging station 602 the packaging shells are placed on a carrier on which the packaging shells are further transported through the packaging module PP. For example, five packaging shells are arranged on the same carrier. In a subsequent fourth packaging station 603, the contact lenses that have successfully passed all inspections in the inspection module IM are placed into the packaging shells arranged on the carrier, until each of the packaging shells contains a contact lens (in each of the individual packaging shells on the same carrier the same type of contact lens is contained). The transfer of a contact lens out of the inspection cuvettes used in the inspection module and into a packaging shell arranged on the carrier can be performed, with the aid of a gripper. A gripper suitable for this transfer is described in WO 2011/026868, for example.

In the fifth packaging station 604 (labelled "lens presence check"), which is a lens detection station, it is determined whether in each of the packaging shells a contact lens is contained in order to prevent a packaging shell from being sealed with a foil with no contact lens being contained in the packaging shell for any reason (for example, a contact lens has not been properly placed in the packaging shell, or a gripper has indicated that a contact lens has adhered to the gripper and has been placed into the shell although actually no contact lens has adhered to the gripper). The lens presence check can be performed, for example, with the aid of a camera suitable to read the lens identification code of the contact lens which does not only indicate the presence of a contact lens in the packaging shell but can also be used to check (by reading the lens identification code and determining the type of contact lens actually contained in the packaging shell) whether the type of contact lens contained in the packaging shell is the type of contact lens which is expected to be detected in the lens detection station at that time. This will be discussed in further detail below.

The carrier is then moved to a sixth packaging station 605 (labelled "Configuration station") which is an optional station. The configuration station is a kind of an intermediate buffer in which contact lenses can be temporarily stored in packaging shells (without a foil being sealed thereto), however, only for a predetermined time so as to prevent the contact lenses in the packaging shells from drying. If it has been detected in the fifth packaging station 604 ("lens presence check") that there is one or more shells arranged on the carrier in which no contact lens is contained, a check is performed whether one or more shells containing a contact lens of the same type are present in the configuration station. In case such packaging shell is present in the configuration station, the shell on the carrier that does not contain a contact lens is removed from the carrier and is the corresponding shell containing the same type of contact lens is taken from the configuration station and is placed on the carrier instead.

As the configuration station is optional only, in case there is no configuration station and it is detected during the lens presence check performed in the fifth packaging station 604 that a contact lens is missing in one or more of the packaging shells on a carrier, then the whole arrangement of shells on that carrier is discarded (since the shells arranged on the same carrier are typically sealed together to form a strip as will be described below, and this would mean that in one or more of the shells of a strip no contact lens is contained, which is not acceptable).

In a seventh packaging station 606 (labelled "Dose saline") a predetermined amount of packaging liquid is dispensed (dosed) into each of the packaging shells.

It is of course also possible to arrange the fifth packaging station 604 ("lens presence check") downstream of the seventh packaging station 606 ("Dose saline"), in particular as it may turn out that the lens identification code is difficult to read as the contact lens may not be completely unfolded without a sufficient amount of saline being present in the packaging shell.

In a subsequent eighth packaging station 607 (labelled "Place foil on shell") a foil, for example a laminated aluminum foil comprising a thermoplastic layer, is placed on the shell. Alternatively, as is well-known, a foil strip extending over a plurality of packaging shells adjacently arranged on a carrier is sealed to each of the adjacently arranged packaging shells to form a strip of contact lens packages in which the individual packages of the strip are connected to one another by the foil strip. The foil strip connecting the individual packages to the strip of contact lens packages can be scored or perforated at the connection between adjacent packages of the strip so as to allow for separation of an individual contact lens package from the strip.

Thereafter, in a ninth packaging station 608 (labelled "Sealing") the foil or the foil strip, respectively, is sealed to the packaging shell (or to the packages, respectively) at the top surface of the packaging shell. In a subsequent tenth packaging station 609 (labelled "Laser printing on foil") information (e.g. base curve radius, optical power, etc.) related to the contact lens contained in the package is printed on the foil, for example by using laser printing technique.

Dosing packaging liquid into the shell, lens presence check, placing and sealing of a foil to the shell, and laser printing are all conventional techniques and, therefore, they are not discussed in detail.

In an (optional) eleventh packaging step 610 (labelled "Pull samples") some sealed packages or strips of the sealed packages may be taken from the production line from time to time and may be inspected offline to make sure that the production line works well and to ensure quality of the packaged contact lenses. Finally, in a twelfth packaging step 611 (labelled "Blister into magazines") the sealed and printed contact lens packages or strips of contact lens packages are removed from the carriers and are placed into magazines for autoclaving. The carriers are then returned for the next packaging shells being placed on them.

Autoclaving of the contact lens packages or strips of contact lens packages is then performed in an autoclave 700, and once autoclaving is performed the autoclaved contact lens packages are further placed in a secondary packaging line 800 (labelled "Secondary packaging") into secondary packages, for example cartons, which form the final product 900 for subsequent shipping.

As has been mentioned above already, with the modular production line PL according to the invention, and in particular with the manufacturing module MM according to the invention, it is possible to perform a lot change on the fly, that is to say it is possible to exchange (replace) at least one of the molds on the lens mold carriers without the need to interrupt production and without the need to clear the production line by removing all lens mold carriers from the production line and place new lens mold carriers on the production line.

Figure 3:
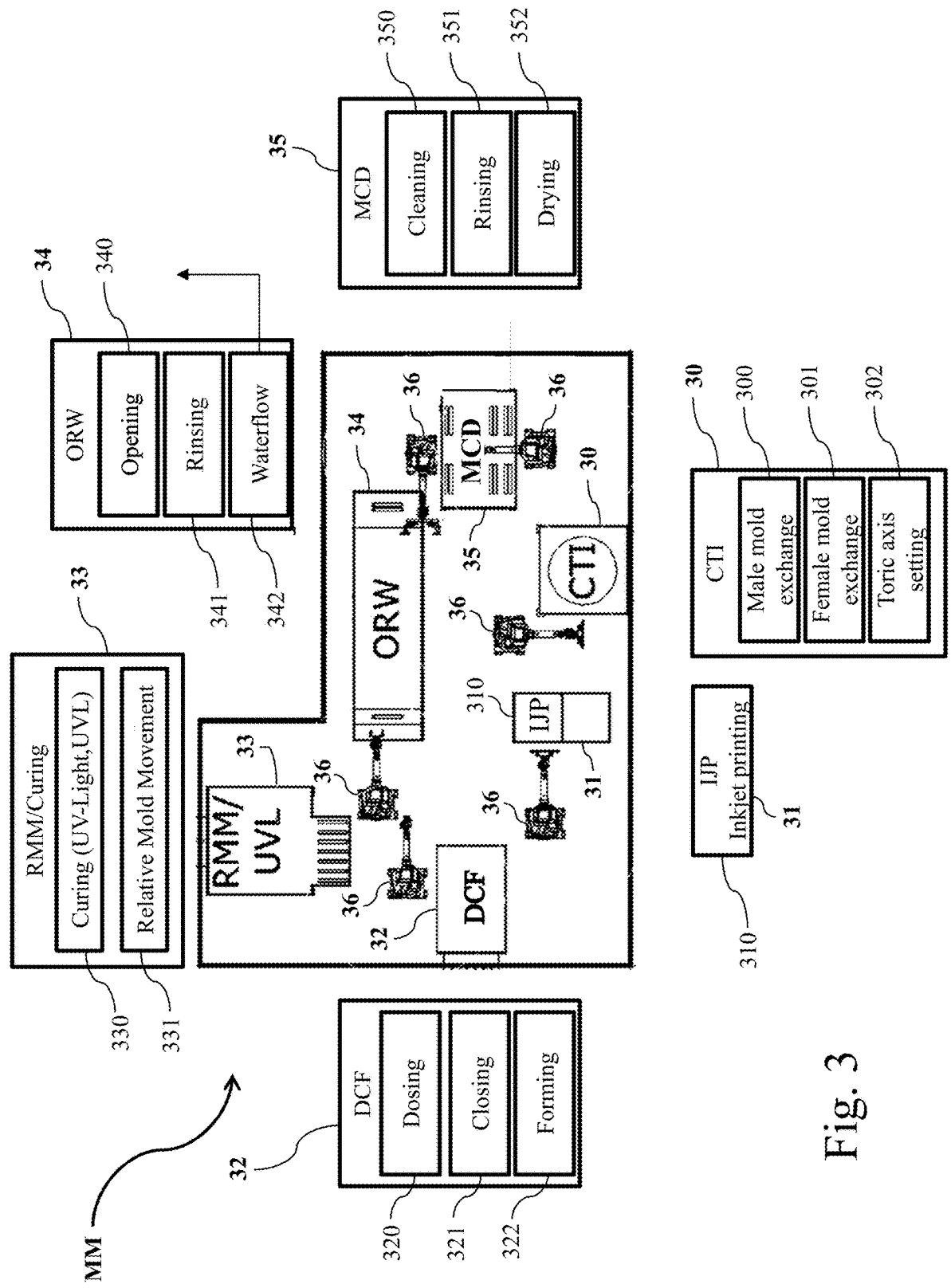
FIG. 3 shows an embodiment of the manufacturing module of the production line according to the invention.
Figure 11:
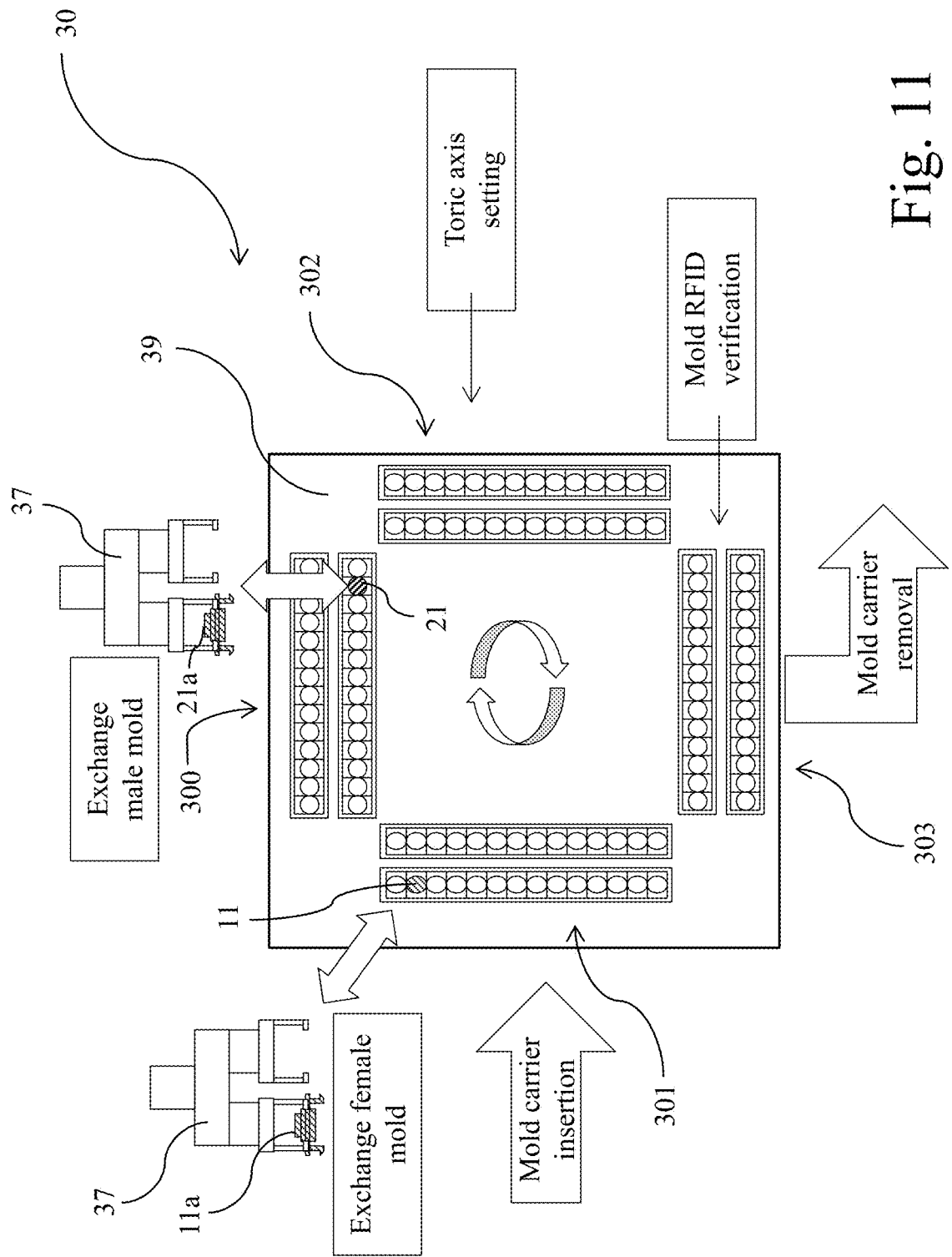
FIG. 11 shows an embodiment of the mold changing station of the manufacturing module.

In the manufacturing module MM, the lot change on the fly can be performed by the first manufacturing unit 30 (labelled "CTI") in FIG. 2 and FIG. 3. One example of such manufacturing unit 30 is shown in more detail in FIG. 11. Insertion and removal of the lens mold carriers 1, 2 into and from the manufacturing unit 30 are indicated by respective arrows. Manufacturing unit 30 comprises a rotary table 39 which can be rotated clockwise, for example, as is indicated in FIG. 11 by the curved arrows in the center of table 39. At station 301, female molds can be exchanged by removing female mold units 11 from their compartment 100 of lens mold carrier 1 and by mounting a different female mold unit 11a to the said compartment 100 of lens mold carrier 1 from which female mold unit 11 has been removed. For example, in FIG. 11 it is shown that female mold unit 11 arranged at position number two (hatched in FIG. 11) of lens mold carrier 1 is exchanged and replaced with a different female mold unit 11a with the aid of a respective exchange tool 37, as will be described in more detail below with respect to FIG. 12. Once the exchange of female mold unit 11 is completed, rotary table 39 is rotated clockwise by ninety degrees so that at station 300 a male mold exchange can be performed. Exchange of a male mold unit 21 (and replacement with a different male mold unit 21a) can be performed similar to an exchange of a female mold unit in the same manner using a similar mold exchange tool 37. By way of example, exchange of male mold unit 21 may be performed at position number two of lens mold carrier 2. The male and female mold exchanges (by exchanging the mold units) are indicated by double-headed arrows in FIG. 11. Once the exchange of the male mold unit 21 is completed, rotary table 39 is again rotated clockwise by ninety degrees, so that at station 302 a toric axis setting/change can be performed. This can be performed, for example, with a suitable rotation tool (not shown) which may engage the flat surfaces of sleeve 211 at the back end of male mold unit 21 (see FIG. 10) and rotate sleeve 211 either clockwise or counterclockwise by one or more teeth of the toothed adjusting ring 214, as this is already described further above. Once the toric axis setting/change is completed, table 39 is rotated again clockwise by ninety degrees so that in a further station 303 the individual RFIDS of the molds can be read and stored so that it is known what type of mold is arranged at what compartment 100, 200 of the lens mold carriers 1, 2. Lens mold carriers 1, 2 are then removed with the aid of a robot 36 and are transported to the next station, for example the inkjet printing station 310 as described above with respect to FIG. 2 and FIG. 3. It goes without saying, that either a male mold exchange, or a female mold exchange, or a toric axis change/setting can be performed in order to perform a lot change on the fly, or combinations thereof. If no lot change on the fly is to be performed, none of these exchanges/changes/settings is performed.

Figure 12:
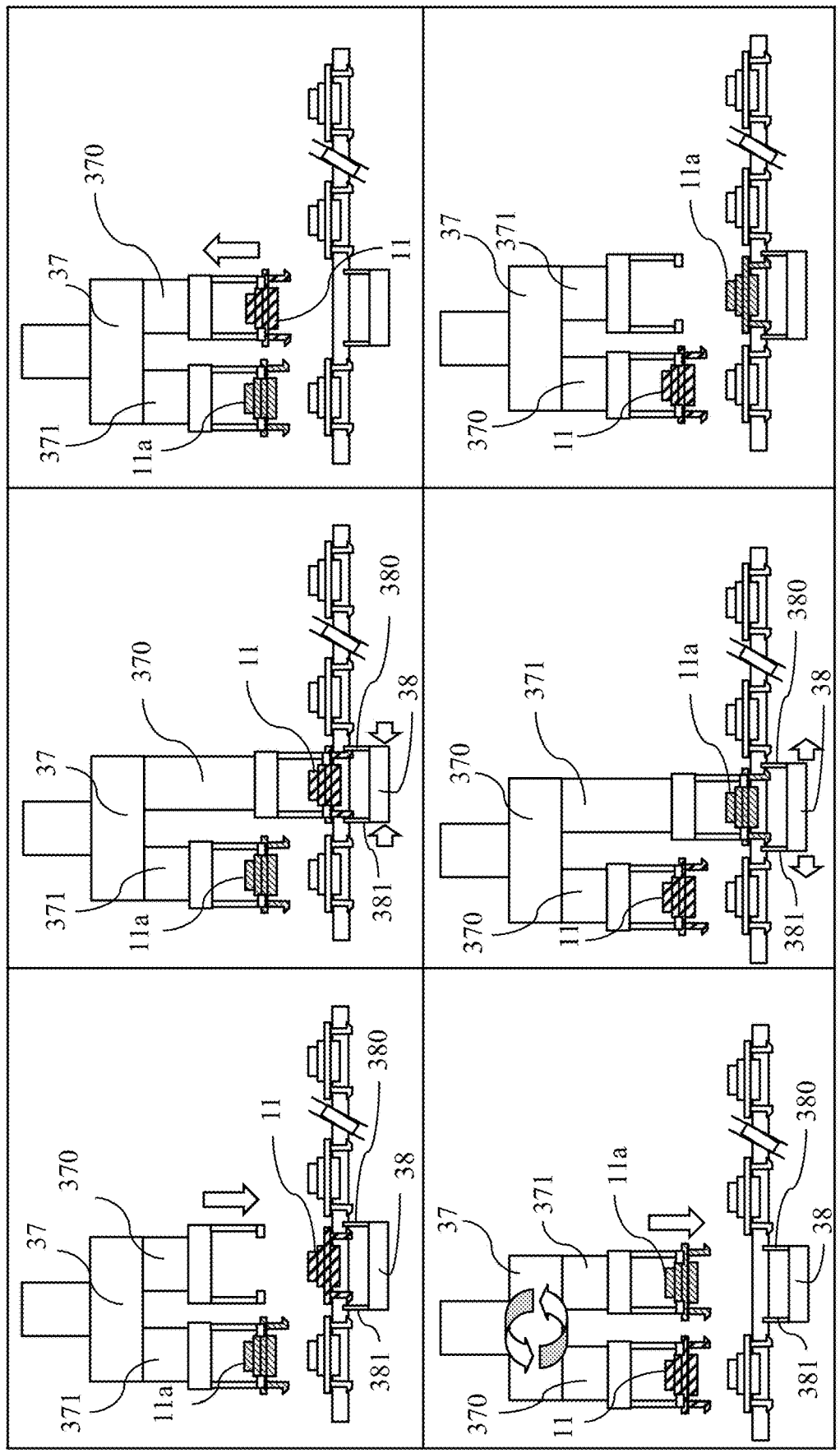
FIG. 12 shows the various states and actions performed during a mold exchange.

FIG. 12 shows the individual states during a female mold exchange performed with the aid of an exchange tool 37. In the upper left box of FIG. 12, exchange tool 37 is shown in its initial position. In this initial position, exchange tool 37 is arranged above female mold unit 11 arranged in the compartment 100 at position number two of lens mold carrier 1. Exchange tool 37 comprises two gripper arms 370, 371. Gripper arm 370 is empty and ready for gripping female mold unit 11 to be removed from compartment 100 of lens mold carrier 1 while gripper arm 371 holds a new female mold unit 11a to be inserted into the said compartment 100 of lens mold carrier 1 after female mold unit 11 has been removed. As can be seen further in FIG. 12, there is a snap fit release tool 38 having two arms 380, 381 that can be moved towards and away from each other. As is indicated by the arrow in the upper left box of FIG. 12, exchange tool 37 is then lowered from the initial position towards female mold unit 11 to be exchanged.

In the upper central box of FIG. 12, it is shown that gripper arm 370 of exchange tool 37 has been lowered until it engages female mold unit 11. Arms 380, 381 of snap fit release tool 38 are moved towards each other (see arrows) to flex resilient latches 113 (see FIG. 5) of female mold unit 11 inwardly. As can be seen in the upper right box of FIG. 12, gripper arm 370 of exchange tool 37 is then raised again (see arrow) with female mold unit being gripped by gripper arm 370, thus removing female mold unit 11 from compartment 100 of lens mold carrier 1. As can be seen in the lower left box of FIG. 12, exchange tool 37 is then rotated clockwise or counterclockwise by 180° thus arranging gripper arm 371 holding new female mold unit 11a to be inserted above the compartment 100 of lens mold carrier 1 from which female mold unit 11 has been removed. Gripper arm 371 of exchange tool 37 is then lowered (see arrow in lower left box of FIG. 12) until new female mold unit 11 a is placed into compartment 100 of lens mold carrier 1. At that time, arms 380, 381 of snap fit release tool 38 are still in the position in which they have been moved towards each other to allow for easy insertion of the resilient latches of new female mold unit 11a into compartment 100 of lens mold carrier 1. Once new female mold unit 11a has been inserted into compartment 100 of lens mold carrier 1 as shown in the central lower box of FIG. 12, arms 380, 381 of snap fit release tool 38 are moved away from each other again (see arrows in central lower box of FIG. 12). New female mold unit 11a is now mounted to the frame of lens mold carrier 1 at compartment 100, and the exchange process is then completed.

As has been mentioned above, in a lens detection station which—in the embodiment described—may be either included in the cosmetic inspection station 502 of the inspection module IM or may be the lens detection station 604 of the packaging module PP in which the lens presence check is performed, it is determined whether the type of contact lens detected in the lens detection station is the type of contact lens which is expected to be detected at that time. Detection of the type of contact lens is of particular importance in case a lot change on the fly has been performed (while not being limited to lot changes), since it must be made sure that at any time during the production process the type of contact lens placed into the respective packaging shell is that type of contact lens which is expected to be in the packaging shell, since otherwise corrective action is required. As has been described above, for the purpose of detecting the type of contact lens a lens identification code may be applied to each contact lens which can be read in the lens detection station and from which the type of contact lens can be detected.

This lens identification code may either be embodied as a unique lot number, so that upon reading the lot number all information about the type of contact lens of a specific lot can be obtained from a look-up table in which this information is stored for each individual lot number. Alternatively, a unique lens identification code representative of the type of contact lens is applied to each contact lens, and such unique lens identification code does not need to include the lot number. Application of the unique lens identification code can be performed either with the aid of printing techniques, in particular through inkjet printing, or by applying the code through elevations which are provided on the respective mold or molds used to manufacture the contact lens (i.e. through embossing) and which are then included in the contact lens as depressions or engravings.

An embodiment of a lens identification code on a contact lens 7 is shown in FIG. 13. In this embodiment, the lens identification code comprises three code portions, a first lens identification code portion 70, a second lens identification code portion 71, and a third lens identification code portion 72. First lens identification code portion 70 comprises information about the lens design, including information about the spherical corrective power, the base curve radius and the lens diameter. First lens identification code portion 70 is labelled "XYZ" in FIG. 13, and is arranged in an upper, non-optical peripheral portion of the front surface of the contact lens 7.

First lens identification code portion 70 and second lens identification code portion 71 are arranged opposite to each other relative to the center of the contact lens 7. Second lens identification code portion 71 is arranged in a lower, non-optical peripheral portion of the front surface of the contact lens 7. Second lens identification code portion 71 comprises a line mark which indicates a desired rotational orientation of the contact lens 7 when the contact lens is arranged on the eye of the user. For example, in the desired orientation of the contact lens 7 on the eye the line mark may be arranged vertically. Thus, the second lens identification code portion 71 (the line mark) is an orientation mark that helps the optician check whether the contact lens is properly oriented when it is worn on the eye of the user which is important for toric contact lenses.

Third lens identification code portion 72 comprises two marks which are also arranged in a non-optical peripheral portion, however, they are arranged on the back surface of the contact lens 7 opposite to each other relative to the center of the contact lens 7. The two marks of third lens identification code portion 72 in the embodiment comprise two diamond marks. The diamond marks include information about both the amount of cylindrical power as well as about the orientation of the major cylinder axis. The orientation of the major cylinder axis is given by a straight line connecting the two oppositely arranged diamond marks and extending through the center of the contact lens 7 (the line mark of first lens identification code portion 71 is arranged to face downwards). The shape of the marks (here diamonds) is indicative of the amount of the cylindrical power. Other shapes of marks, for example triangular marks which may be oriented with their base downwards and the peak upwards (or oriented upside down, i.e. with their peak downwards), or oppositely arranged short straight line marks pointing towards each other, may be used to indicate other amounts of cylindrical add power while at the same time they are indicative of the orientation of the major cylinder axis. As is conventional, the minor cylinder axis is arranged perpendicular to the major cylinder axis.

The lens identification code comprising first lens identification code portion 70, second lens identification code portion 71, and third lens identification code portion 72 may be applied to the contact lens 7 either through embossing (i.e. through elevations that may be provided in peripheral portions on the lens forming surfaces of the male and female lens molds) or may be applied to the to the contact lens 7 by printing them to the lens molds and transferring them to the contact lens during manufacture of the contact lens.

As has been mentioned before, in the embodiment of the production line PL described in order to detect the type of contact lens, the lens identification code can be read either in the cosmetic inspection station 502 of the inspection module IM or in the lens detection station 604 of the packaging module PP. For example, in case packaging shells are used which are not clear transparent it may be difficult to read a lens identification code that has been applied to the contact lens through embossing (i.e. through elevations in the peripheral portions of the male and female lens molds) so that in this case it may be advantageous to detect the type of contact lens in the cosmetic inspection station 502 of the inspection module IM. In this case it must be made sure that the contact lens inspected in the inspection module IM is securely transferred to the packaging shell in the packaging module PP. Such secure transfer can be performed, for example, using a gripper as described in WO 2011/026868. In case packaging shells are used which are clear transparent it is also possible to read the lens identification code in the lens-detection station 604 of the packaging module PP even if it has been applied to the contact lens through embossing. In case the lens identification code has been applied through inkjet printing (colored marks) the lens identification code may preferably be read in the lens detection station 604 of the packaging module PP (although in principle it is also possible to read the lens identification code in the cosmetic inspection station 502 of the inspection module IM).

While embodiments of the production line according to the invention have been described above with the aid of the drawings, it is evident that many modifications and changes are possible without departing from the teaching underlying the invention. Therefore, the invention is not limited to the embodiments shown and described, but rather the scope of protection is defined by the appended claims.

The invention claimed is:

1. Production line (PL) for the production of contact lenses, the production line comprising
   a manufacturing module (MM) in which the contact lenses are manufactured,
   an inspection module (IM) in which the contact lenses manufactured are inspected, and
   a packaging module (PP) in which the ophthalmic lenses which have been identified by the inspection module (IM) as being acceptable are packed into primary packages,
   wherein the manufacturing module (MM) comprises a plurality of manufacturing stations comprising a dosing station (320), a closing station (321), a forming station (322), a curing station (330), a mold opening station (340), a removal station (342), for manufacturing the contact lenses, with at least one of these manufacturing stations comprising a dosing station (320), a closing station (321), a forming station (322), and a curing station (330), being configured to apply a lens identification code to the respective contact lens, the lens identification code including information indicative of the type of the respective contact lens manufactured,
   wherein the modular production line further comprises fixedly arranged transfer interfaces between individual modules (MM, IM, PP) for transferring the contact lenses from a respective preceding module of the at least three separate modules to a respective subsequent module of the at least three separate modules,
   wherein either the inspection module (IM) or the packaging module (PP) includes a lens detection station configured to read the lens identification code applied to the respective contact lens and to detect the type of the contact lens from the lens identification code read from the respective contact lens in order to determine whether the type of contact lens detected actually is the type of contact lens which is expected to be detected by the lens detection station at that time.

2. Production line according to claim 1, wherein the lens detection station is arranged in the inspection module (IM).

3. Production line according to claim 2, wherein the inspection module (IM) comprises a cosmetic inspection station for inspecting the contact lens for cosmetic defects, and wherein the cosmetic inspection station is configured to include the lens detection station.

4. Production line according to claim 1, wherein the lens detection station is arranged in the packaging module (PP).

5. Production line according to claim 4, wherein the lens detection station (604) is arranged in the packaging module (PP) at a location downstream of a lens placement station (603) for placing the contact lens into a primary package and upstream of a liquid dosing station (606) for dosing a packaging liquid into the primary package, or is arranged downstream of the liquid dosing station (606).

6. Production line according to claim 5, wherein the packaging module (PP) comprises a shell providing station (602) for providing a packaging shell, the lens placement station (603) for placing the contact lens into the packaging shell, the lens detection station (604), the liquid dosing station (606), a foil placement station (607) for placing a foil onto the packaging shell: a sealing station (608) for sealing the foil to the packaging shell, and a printing station (609) for printing on the foil information about the contact lens contained in the sealed packaging shell.

7. Production line according to claim 6, wherein the packaging module (PP) further comprises a configuration station (605) for intermediately storing a plurality of contact lenses, and for placing a contact lens intermediately stored in the configuration station (605) into said packaging shell in case it has been detected in the lens detection station (604) that no contact lens has been placed into the packaging shell in the lens placement station (603).

8. Production line according to claim 1, wherein the manufacturing module (MM) is configured to apply to each contact lens a unique lens identification code which is representative of the type of lens at least for a predetermined period of time.

9. Production line according to claim 8, wherein the manufacturing module (MM) comprises molds for the manufacture of the contact lenses and a printing station (310), wherein the printing station (310) is configured to print the unique lens identification code to at least one of the molds used to manufacture the respective contact lens.

10. Production line according to claim 9, wherein the printing station (310) is an inkjet printing station.

11. Production line according to claim 1, wherein the manufacturing module (MM) comprises molds for the manufacture of the contact lenses, the molds carrying the unique lens identification code as elevations formed on a molding surface of at least one of the molds used to manufacture the respective contact lens.

12. Production line according to claim 1, further comprising an extraction and treatment module (EM) for the extraction and chemical treatment of the contact lenses manufactured in the manufacturing module (MM).

* * * * *